US010191175B2

(12) United States Patent
Sorensen

(10) Patent No.: US 10,191,175 B2
(45) Date of Patent: Jan. 29, 2019

(54) METHOD AND SYSTEM FOR MAPPING A GEOLOGICAL STRUCTURE OF A FORMATION ON ONE SIDE OF A SURFACE USING MAGNETIC MOMENTS OF DIFFERENT VALUES

(71) Applicant: Skytem Survey APS, Aarhus (DK)

(72) Inventor: Kurt Ingvard Sorensen, Horning (DK)

(73) Assignee: Skytem Survey APS, Aarhus (DK)

( * ) Notice: Subject to any disclaimer, the term of this patent is extended or adjusted under 35 U.S.C. 154(b) by 241 days.

(21) Appl. No.: 14/250,300

(22) Filed: Apr. 10, 2014

(65) Prior Publication Data
US 2014/0218038 A1 Aug. 7, 2014

Related U.S. Application Data

(63) Continuation of application No. 14/129,109, filed as application No. PCT/DK2012/050168 on May 14, 2012, now Pat. No. 9,405,031.

(30) Foreign Application Priority Data

Jun. 24, 2011 (DK) .................................. 2011 70327

(51) Int. Cl.
*G01V 3/08* (2006.01)
(52) U.S. Cl.
CPC ..................................... *G01V 3/08* (2013.01)
(58) Field of Classification Search
CPC ...................................................... G01V 3/08
(Continued)

(56) References Cited

U.S. PATENT DOCUMENTS

| 4,544,892 A | 10/1985 | Kaufman et al. |
| 5,796,253 A | 8/1998 | Bosnar et al. |

(Continued)

FOREIGN PATENT DOCUMENTS

| JP | 2009-079931 A | 4/2009 |
| SU | 1603329 A1 | 10/1990 |

(Continued)

OTHER PUBLICATIONS

Halkjaer et al., Geoforce-SkyTEM Technical Description, Aug. 5, 2018.*

(Continued)

*Primary Examiner* — Jermele M Hollington
*Assistant Examiner* — Douglas X Rodriguez
(74) *Attorney, Agent, or Firm* — Vista IP Law Group, LLP

(57) ABSTRACT

A method for mapping geological structures of a formation on a side of a surface, includes: generating a magnetic moment using at least one magnetic moment generator to build up a magnetic field in the formation in an on-period, wherein the magnetic moment has a moment strength, and wherein the magnetic moment is positioned on another side of the surface; changing the magnetic moment to change the magnetic field; and making at least one record in a recording device at a recording time $t_{record}$ in an off-period, wherein the record includes at least a representation of the change in the magnetic field and/or a representation of the magnetic field obtained by a B/E-measuring unit; wherein the on-period is separated from the off-period by the act of changing the magnetic moment.

45 Claims, 10 Drawing Sheets

(58) Field of Classification Search
USPC .......................................................... 324/334
See application file for complete search history.

(56) References Cited

U.S. PATENT DOCUMENTS

| | | | |
|---|---|---|---|
| 7,236,885 B2* | 6/2007 | Macfarlane et al. ............. | 702/2 |
| 8,362,779 B2* | 1/2013 | Kuzmin et al. ................ | 324/330 |
| 2005/0001622 A1 | 1/2005 | Morrison et al. | |
| 2006/0015255 A1 | 1/2006 | Sorensen | |
| 2007/0177705 A1 | 8/2007 | Lu et al. | |
| 2010/0052685 A1† | 3/2010 | Kuzmin | |

FOREIGN PATENT DOCUMENTS

| | | |
|---|---|---|
| WO | 09041343 | 4/2009 |
| WO | 2010022515 | 4/2010 |

OTHER PUBLICATIONS

James Reid, et al., "High Resolution Near Surface Airborne Electromagnetics" ASEG 2007, 4 pages.

Auken, et al., "An integrated processing scheme for high-resolution airborne electromagnetic suverys, the SkyTEM system", CSIRO Publishing, Exploration Geophysics, 2009, 10 pages.

Auken, et al., "Processing and inversion of SkyTEM data for high resolution hydrogeophysical surveys", ASEG 2007, Perth, Western Australia, 4 pages.

Reid, et al., "High-Resolution Near Surface Airborne Electromagnetics—SkyTEM Survey for Uranium Exploration at Pells Range, WA", ASEG 2007, Perth, Western Australia, 4 pages.

Reid, et al., "High-Resolution Airborne Electromagnetic Surveying for Dryland Salinity Management: The Toolibin Lake SkyTEM Case Study, W.A.", ASEG 2007, Perth, Western Australia, 5 pages.

Translation of JP 2009-079931. Apr. 16, 2009.

Non-final Office Action dated Sep. 3, 2015 for related U.S. Appl. No. 14/129,109.

Final Office Action dated Jan. 25, 2016 for related U.S. Appl. No. 14/129,109.

Notice of Allowance and Fee(s) due dated Mar. 17, 2016 for related U.S. Appl. No. 14/129,109.

Written Opinion and International Search Report dated Sep. 5, 2012 for related International PCT Application No. PCT/US2012/050168, 9 pages.

Danish Search Report dated Feb. 6, 2012, for related DK Patent Application No. PA 2011 70327, 1 page.

First Technical Examination dated Feb. 7, 2012, for related DK Patent Application No. PA 2011 70327, 3 pages.

Office Action dated Sep. 19, 2012, for related Canadian Patent Application No. 2,776,708, 2 pages.

James Reid and Andrea Viezzoli, "High-Resolution Near Surface Airborne Electromagnetics—SkyTEM Survey for Uranium Exploration at Pells Range, WA," ASEG Extended Abstracts, vol. 2007 (1) pp. 1-4 Pages submitted: 1-4; Published: Mar. 1, 2007; Publisher: Australian Society of Exploration Geophysicists/CSIRO Publishing; Place of publication: Clayton, Victoria, Australia.†

\* cited by examiner
† cited by third party

Δt < 1 sek
ΔX < 50 m

METHOD AND SYSTEM FOR MAPPING A GEOLOGICAL STRUCTURE OF A FORMATION ON ONE SIDE OF A SURFACE USING MAGNETIC MOMENTS OF DIFFERENT VALUES

RELATED APPLICATION DATA

This application is a continuation of U.S. patent application Ser. No. 14/129,109, filed on Dec. 23, 2013, pending, which is the national phase of International Patent Application No. PCT/DK2012/050168, filed on May 14, 2012, pending, which claims priority to Danish Patent Application No. PA 2011 70327, filed on Jun. 24, 2011. The entire disclosures of all of the above applications are expressly incorporated by reference herein.

FIELD AND BACKGROUND

The present disclosure relates to a method for mapping a geological structure of a formation on one side of a surface.

SUMMARY

The present disclosure relates to a method for mapping a geological structure of a formation on one side of a surface, and comprising a sequence lasting a sequence period and comprising:
  an on-period where a magnetic field is built up in the said formation by generating a magnetic moment, which magnetic moment has a moment strength, using at least one transmitter coil, which is positioned on the other side of the surface at a given position, which on-period is separated from an off-period by a step where
  the magnetic field is brought to change by changing the magnetic moment, and where
  the off-period where at a recording time $t_{record}$ in a recording device at least one record is made, which record includes at least:
    a representation of the change in the magnetic field and/or
    a representation of the magnetic field
obtained by a B/E-measuring unit, and where at least two sequences are performed where each sequence is performed with different absolute values of moment strengths of magnetic moments and/or different on-time periods of magnetic moments and that the duration of the said least two sequences is less than 1 second.

The present disclosure further relates to a measuring equipment for mapping the geological structures in a formation on one side of a surface, and comprising:
  at least one magnetic moment generator which is positioned on the other side of the surface at a given position, which magnetic moment generator is for generating a magnetic moment, which magnetic moment has a moment strength and a on-time period, thereby a magnetic field is built up in the said formation,
  at least one changing means for changing the magnetic moment for changing the magnetic field in the formation,
  at least one B/E-measuring unit for measuring a magnetic field and/or the change in a magnetic field,
  a recording device for recording at a recording time $t_{record}$ at least one record, which record includes at least:
    a representation of the change in the magnetic field and/or
    a representation of the magnetic field
obtained by the B/E-measuring unit and said measuring equipment and further comprises a sequence generator configured for generating at least two sequences with different absolute values of moment strengths of magnetic moments and/or different on-time periods of magnetic moments and that the duration of the said least two sequence periods is less than 1 second.

The present disclosure further relates to a method and a system for mapping the geological structures in a formation on one side of a surface, and comprising a sequence lasting a sequence period and comprising at least two sequences are performed, in which said each sequence is performed at different recording times $t_{record}$ with different magnetic fields at the same position or at two adjacent positions, which adjacent positions are separated by a maximum distance of 50 m.

An embodiment described herein relates to a method and equipment for mapping a geological structure of a formation on one side of a surface and equipment and methods are described in the patent publication US 2006/0015255 or its patent family. An embodiment disclosed therein relates to measuring equipment and method for mapping the geological structures in an underground formation by means of transient electromagnetic sounding.

Measuring a given signal, and in particular electromagnetic signals, representing a physical property inherently involves the task of separating the part of the signal that represents the desired physical property and the part of the signal that represents noise.

Generally the noise component consists of two parts. One noise part is random noise originating from components or somehow stochastic sources.

Another noise part is coherent noise originating from sources constructed to work or function according to some rules thereby resulting in somehow regular or correlated noise components.

Examples of such coherent noise parts are industrial noise correlated with the grid frequency and in particular harmonics of the given grid frequency.

Other examples of coherent noise parts are those originating from timing units for example based on crystals as radio transmitters.

One strategy to reduce noise or even to eliminate noise to an acceptable level is to understand how the actual measuring equipment used to collect the signal is built and to use components that have acceptable noise levels.

Another problem with surveys where the measuring equipment is translocated to survey a larger area is the vertical and horizontal resolution of the underground of a mapping area.

The larger magnetic moments, the longer time it will take for the equipment to turn of the transmitter current thereby increasing the lower limit of the undisturbed measuring period.

At the same time the decay signal from the geological structure increases thereby increasing the signal to noise ratio and thereby increasing the upper limit of the undisturbed measuring period.

As measurements to the later times of the measuring period relates to the resistance of deep geological structures and as measurements to the earlier times of the measuring period relates to the resistance of near surface geological structures, it is desirable to obtain undisturbed measuring periods.

Thereby insufficiency or holes in the data exist. This means that the subsurface geological structures are not surveyed at certain positions or with a sufficient spatial resolution in a horizontal plane or with a sufficient vertical, or in the depth, resolution.

This is particularly important when using airborne survey techniques where the survey is conducted by flying with measuring equipment above a surface. This allows for covering large areas as fast as possible, but using technologies as described in the prior art suffers from the problems described.

It is the object to provide measuring equipment for mapping a geological structure of a formation on one side of a surface, which measuring equipment is capable of performing multiple measurements, and preferably measurements of different resolution, size, strength or length of time, during a measurement period/cycle whilst the measuring equipment is translocated on the other side of the surface.

A further object is to obtain a mapping of the geological structures in one side of a surface with a deeper and/or a higher resolution in the depth into the surface.

A further object is to obtain a mapping of the geological structures at one side formation, which mapping can resolve formations on one side of with a limited projected extend onto the surface.

A further object is to reduce the influence of industrial noise in the measurements. By industrial noise is meant grid-noise, noise from machinery operating at fixed or varying frequency.

Know methods and systems for measuring a formation in one side of a surface are limited to the problem that using a large magnetic moment to probe the formation on one side of the surface results in a longer cut-off period during which cut-off period the transient signal to be measured decreases thereby This is solved by one or more features. In one aspect, by a method for mapping the geological structures of a formation on one side of a surface, and comprising a sequence lasting a sequence period and comprising at least one moment period with:

an on-period where a magnetic field is built up in the said formation by generating a magnetic moment, which magnetic moment has a moment strength, using at least one magnetic moment generator, which is positioned on the other side of the surface at a given position, which on-period is separated from an off-period by a step where the magnetic field is brought to change by changing the magnetic moment, and where the off-period where at a recording time $t_{record}$ in a recording device at least one record is made, which record includes at least:

a representation of the change in the magnetic field and/or a representation of the magnetic field obtained by a B/E-measuring unit, and where at least two sequences are performed where each sequence is performed with different absolute values of moment strengths of magnetic moments and/or different on-time periods of magnetic moments and that the duration of the said least two sequences is less than 1 second.

As per definition the on-time period is when there is a magnetic moment. The strength of the magnetic moment will in general constant to within some tolerance. The on-period will be controlled by a switch. Generally when the switch is on, the on-time period is on. However, due to laws of physics and engineering, the magnetic moment can not switch on instantly.

As per definition the off-period is when the switch is off. However, due to laws of physics and engineering, the magnetic moment can not disappear instantly. Depending on the actual means for generating the magnetic moment, different mechanisms determine the real decay of the magnetic moment from certain strength to another strength such as zero.

In the case of generating the magnetic moment by conducting a current through a coil and switching off the current, there will be a period where the current mitigates. This process usually consists of a linear decay, which is predominantly an avalanche process, and an exponential decay which is due to self-inductance and resistance in the electrical circuit. Either part is included in the off-period.

In a particular situation the surface is the ground surface. In this case the formation is on the one side of the ground surface being in the ground and the magnetic moment being generated on the other side of the surface in the air or on the ground.

In a special situation, but not an unusual situation, the surface is the surface of a hill or a mountain.

In yet another situation, the surface is the wall or the side of a cave, a corridor, a shaft or a pit.

In yet another situation, the surface is sea bed and the magnetic moment is generated in the sea, on the surface of the sea or above the surface of the sea.

In yet another situation, the surface is the wall or the side of an undersea cave or overhang.

According to an embodiment, the magnetic moment is generated by the magnetic moment generator, which comprises at least one transmitter unit and at least one transmitter coil with at least one conducting wire. The transmitter coil is formed as a loop that covers an area A and carries a current $I_T$, which current $I_T$ is supplied by at least one current source.

The strength of the magnetic moment is named the moment strength. The moment strength is determined by the combination of the area A, the current $I_T$, and the number of turns in the transmitter coil and/or the number of transmitter coils. By absolute values of magnetic moment strengths is understood the numerical value of the moment strength made a positive value.

The period of the magnetic moment is named the moment period or the on-time period. The on-time period is determined by the time of the beginning of the magnetic moment and the time of the end of the magnetic moment. It is understood, that the magnetic moment has a base value that can be zero, minimal or offset and that the beginning and the end of the period can be understood as a significant deviation from the base value.

The magnetic field in the formation on one side of the surface can be brought to change by changing the magnetic moment on the other side of the surface.

In an embodiment, the change in the magnetic moment is achieved by turning down or turning off the current $I_T$ in a transmitter coil with at least one wire covering an area A providing the magnetic moment.

In an embodiment, the recording device is a data acquisition device with or with a connection to a timer unit, a processor and a memory. The timer unit is capable of providing a timestamp, which timestamp is $t_{record}$. The recording device has means for making at least one record, which record is structured data associated with the timestamp $t_{record}$. The recording device has means for retrieving data. The recording device has means for communicating with other means. The recording device has trigger means.

In an embodiment, the timer unit is based on an oscillator, which oscillator is a crystal oscillator or similar devices.

In an embodiment, the B/E-measuring unit is capable of measuring a B-field. In an embodiment, the B/E-measuring unit is capable of measuring the change in a B-field.

In an embodiment, the B/E-measuring unit is a magnetometer.

In an embodiment, the B/E-measuring unit is a receiving coil with at least one wire in a loop in which wire a voltage is induced through a change in the magnetic field and which voltage is measured thereby providing a representation of a change in the magnetic field in the formation.

According to an embodiment, the method for mapping the geological structure of a formation is special in that at least one sequence is performed with a magnetic moment of opposite sign to a magnetic moment in at least one other sequence.

By opposite sign is also understood opposite direction or orientations.

Thereby summing the measured contributions from industrial noise with a given main frequency including harmonics from the grid will cancel out each other when the timing between the moments of opposite signs are made to match the periods of those from the industrial noise.

Most common industrial noise is due to the grid frequencies 50 Hz or 60 Hz.

A further advantage is that the resulting alternating currents on average and over time will reduce the accumulation of charges in and on the equipment.

In an embodiment the magnetic moment generator is made of a current generator, a switch and a transmitter coil. The oppositely signed moment can be performed by configuring the current generator to send currents with opposite directions through the same transmitter coil. The oppositely signed moments can be performed by configuring a switch arrangement to send the current from the current generator in different directions into the transmitter coil. The oppositely signed moments can be performed by using two mirrored transmitter coils connected to the same current generator and with a simple switch for sending similar current in one transmitter coil and a current in the other transmitter coil.

According to an embodiment, the method for mapping the geological structure of a formation is special in that at least one sequence is performed with increasing or decreasing absolute values of moment strengths of magnetic moments.

Thereby one such sequence allows for surveying a target or the formation with different vertical resolutions, i.e. at different depths into the formation. Smaller magnetic moment strengths will survey targets near the surface and larger magnetic moment strengths will survey targets deeper into the formation.

An advantage of such increasing or decreasing series is that elements can be charged or de-charged in "one direction" thereby simplifying the electronic arrangements and furthermore reducing the larger changes in currents and charges in the equipment.

In an embodiment, the magnetic moment generator is configured to perform magnetic moments of different sizes and increasing or decreasing absolute values of moment strengths within time periods.

In an embodiment using a current generator, a switch arrangement and at least two different transmitter coils with either different size or different numbers of windings will produce magnetic moments of increasing size by firing the currents into the transmitter coils in an order according to generating at least first an moment with a moment strength and subsequently at least another moment with a moment strength with an absolute larger value.

According to an embodiment, the method for mapping the geological structure of a formation is special in that at least one subsequence of moments is performed with decreasing or increasing absolute values of moment strengths of magnetic moments from one moment generator and at least another subsequence of moments is performed with moment strengths decreasing or increasing in an opposite direction. Thereby each subsystem can perform moments in a simple way without built-ups of charges large current changes and one subsystem can compensate or reduce systematic build-ups or contributions from industrial noise from the other subsystem. A simple way is to synchronise the two subsystems to perform or fire moments with a phase difference equal to the grid period.

According to an embodiment, the method for mapping the geological structure of a formation is special in that a first sequence is performed followed by a second sequence in which second sequence has identical absolute values of moment strengths of magnetic moments, but with opposite signs.

Again by opposite signs is understood opposite directions or orientations.

Thereby industrial noise can be cancelled out and/or charge built up can be reduced.

As outlined, the measuring equipment or method can be configured to generate the moments with opposite signs.

According to an embodiment, the method for mapping the geological structure of a formation is special in that in a pair of sequences each sequence having identical, but opposite signed magnetic moments, the magnetic moments in each sequence of the pair of sequences are separated in time by a time close to or identical to the grid-period or multiples or natural fractions there-off.

Thereby the contribution of industrial noise in the representation of the geological formation will be reduced.

The measuring equipment or the method is configured to timely produce or fire such moments at appropriate times and/or time intervals. To remove grid noise at 50 Hz the pair of sequences are separated in time by multiples or natural fractions of 20 ms.

In one embodiment, this is achieved by using a timing circuit that will control onset and/or the offset of the signals generated by the sequence generator thereby determining the timing of the magnetic moments, the recording device, etc.

In one embodiment, there is a further phase measuring system, and/or some means for phase-locking, capable of detecting the phase of the industrial noise thereby allowing for compensating for possible drift in signals timings between the industrial noise and the signals generated by the sequence generator.

According to an embodiment, the method for mapping the geological structure of a formation is special in that the records from said least two sequences are processed in a computer to form a single representation of the geological structure of the formation at the position.

Thereby information or data in a record obtained from at least two sequences are processed to form a representation of the geological structure or the target in the formation with increased vertical resolution, i.e. in depth resolution, and/or without insufficiency or holes in the data can be achieved.

The computer can be embedded in the measuring equipment or the computer can be located anywhere else as long as means for communication or transferring data from the recording unit to the computer.

According to an embodiment, the computer has means for providing a map or a grid with positions and sequence patterns for a feed back to the sequence generator and the vehicle used to position the measuring equipment at a given position.

Thereby the system is capable of performing a survey in an iterative process, where a formation is surveyed with a coarse grid or resolution and potential interesting areas of the formation results in a finer grid or resolution.

According to an embodiment, the method for mapping the geological structure of a formation is special in that a sequence is performed with the B/E-measuring unit in a position relative to the magnetic moment generator, in which position the induction from the magnetic moment generator in the B/E-measuring unit is zero or minimal.

Thereby representations of the geological structure in the records have the least influence from the measuring equipment it self.

In one embodiment the B/E-measuring unit is a receiver coil and the moment generator is a transmitter coil and the receiving coil is located in a plane that is tangential to a field line of the magnetic field, and the receiving coil is located in a plane that is parallel to the plane of the transmitter coil.

In one embodiment the B/E-measuring unit is placed in a location where the induction is zero or minimal and which location is identified by measurements.

In one embodiment, the B/E-measuring unit is positioned a so-called bucked coil arrangement.

The objective is achieved by measuring equipment for mapping the geological structure of a formation on one side of a surface and is positioned on the other side of the surface at a given position, and comprising:
  at least one magnetic moment generator for generating a magnetic moment, which magnetic moment has a moment strength and an on-time period, thereby a magnetic field is built up in the said formation,
  at least one changing means for changing the magnetic moment for changing the magnetic field in the formation,
  at least one B/E-measuring unit for measuring a magnetic field and/or the change in a magnetic field,
  a recording device for recording at a recording time $t_{record}$ at least one record, which record includes at least:
    a representation of the change in the magnetic field and/or
    a representation of the magnetic field
  obtained by the B/E-measuring unit
where said measuring equipment further comprises a sequence generator configured for generating at least two sequences each sequence with a at least one moment period and for each sequence the measuring equipment is configured for generation of magnetic moments with different absolute values of moment strengths and that the duration of the said least two sequence periods is less than 1 second.

The measuring equipment is as previously described in relation to the equipment used to perform the steps in the method.

According to an embodiment, the measuring equipment for mapping the geological structure of a formation is special in that the sequence generator has control means for alternating said absolute values of moment strengths and/or moment periods.

According to an embodiment, the measuring equipment for mapping the geological structure of a formation is special in that the sequence generator has connection means for transmitting signals to/from at least the magnetic moment generator, the changing means, the B/E-measuring unit or the recording device.

According to an embodiment, the measuring equipment for mapping the geological structure of a formation is special in that the magnetic moment generator has at least two separate sub-moment generators each for generating one magnetic moment in said sequence.

According to an embodiment, the measuring equipment for mapping the geological structure of a formation is special in that the magnetic moment generator has a number of separate sub-moment generators each for generating one magnetic moment in said sequence with a number of magnetic moment.

According to an embodiment, the measuring equipment for mapping the geological structure of a formation is special in that the B/E-measuring unit is in a position relative to the magnetic moment generator, in which position the induction from the magnetic moment generator in the B/E-measuring unit is zero or minimal.

This is solved by one or more features. In one aspect, by a method for mapping the geological structure of a formation on one side of a surface, and comprising a sequence lasting a sequence period and comprising at least one moment period with:
  an on-period where a magnetic field is built up in the said formation by generating a magnetic moment, which magnetic moment has a moment strength, using at least one transmitter coil, which is positioned on the other side of the surface at a given position, which on-period is separated from an off-period by a step where
  the magnetic field is brought to change by changing the magnetic moment, and where
  the off-period where at a recording time $t_{record}$ in a recording device at least one record is made, which record includes at least:
    a representation of the change in the magnetic field and/or
    a representation of the magnetic field
  obtained by a B/E-measuring unit
where said method is were at least two sequences are performed, in which said each sequence is performed at different recording times $t_{record}$ with different magnetic moments at the same position or at two adjacent positions, which adjacent positions are separated by a maximum distance of 50 m.

Thereby information about the geological structure or a target in the formation can be obtained with a higher spatial resolution.

A further advantage is that the recordings of in the vicinity of a spatial location or position can be carried out over several times thereby allowing for a flyover with a coarse grid or resolution followed by flyover with a finer grid or resolution at a later time.

According to an embodiment, a subsequent flyover pattern and a second sequence is generated on the basis of the result of the first flyover.

This is solved by one or more features. In one aspect, by measuring equipment for mapping the geological structure of a formation on one side of a surface, and comprising:
  at least one magnetic moment generator which is positioned on the other side of the surface at a given position, which magnetic moment generator is for generating a magnetic moment, which magnetic moment has a moment strength and a on-time period, thereby a magnetic field is built up in the said formation,
  at least one changing means for changing the magnetic moment for changing the magnetic field in the formation, at least one B/E-measuring unit for measuring a magnetic field and/or the change in a magnetic field, a recording device for recording at a recording time $t_{record}$ at least one record, which record includes at least:

a representation of the change in the magnetic field and/or a representation of the magnetic field obtained by the B/E-measuring unit where said measuring equipment further comprises a sequence generator configured for generating at least two sequences each sequence with a at least one moment period and for each sequence the measuring equipment is configured for at different times t of executing the two sequences at the same position or at two adjacent positions, which adjacent positions are separated by a maximum distance of 50 m.

Essential technical features in this embodiment includes a general position system (GPS) system an means for guiding a vehicle such as an helicopter to a position to within the radius of 50 m of recordings from the first sequence and to design or recall the second sequence accordingly and to be performed or fired at when the measuring equipment is within the radius of 50 m.

Thereby the measuring equipment can be used to effectively and coarsely scan a large area of a formation and allowing for the special areas to be surveyed more finely at a later stage. Thereby the resources needed to flyover the formation in time and fuels are greatly reduced.

A method for mapping geological structures of a formation on a side of a surface, includes: generating a magnetic moment using at least one magnetic moment generator to build up a magnetic field in the formation in an on-period, wherein the magnetic moment has a moment strength, and wherein the magnetic moment is positioned on another side of the surface; changing the magnetic moment to change the magnetic field; and making at least one record in a recording device at a recording time $t_{record}$ in an off-period, wherein the record includes at least a representation of the change in the magnetic field and/or a representation of the magnetic field obtained by a B/E-measuring unit; wherein the on-period is separated from the off-period by the act of changing the magnetic moment; wherein the acts of generating, changing, and making are associated with a first sequence; and wherein the method comprises repeating one or more of the acts of generating, changing, and making for a second sequence, each of the sequences lasting a sequence period and comprising at least one moment period, and wherein each of the sequences is performed with different absolute values of moment strengths of magnetic moments and/or different on-time periods of magnetic moments.

Optionally, a duration of the first and second sequences is less than 1 second.

Optionally, at least one of the sequences is performed with a magnetic moment having an opposite sign to a magnetic moment in another one of the sequences.

Optionally, at least one of the sequences is performed with increasing or decreasing absolute values of moment strengths of magnetic moments.

Optionally, the first sequence is performed followed by the second sequence in which the second sequence has identical absolute values of moment strengths of magnetic moments as those of the first sequence, but with opposite signs.

Optionally, each of the sequences has identical, but opposite signed magnetic moments, the magnetic moments in each of the sequences are separated by a time close to or identical to a grid-period, or multiple thereof, or a natural fraction thereof.

Optionally, the method further includes processing the records from the first and second sequences in a computer to form a representation of the geological structure of the formation.

Optionally, the B/E-measuring unit is in a position relative to the at least one magnetic moment generator for at least the first sequence, in which position an induction from the at least one magnetic moment generator in the B/E-measuring unit is zero or minimal.

Optionally, the magnetic moment is generated on a ground.

Optionally, the magnetic moment is generated in air above a ground.

Optionally, the magnetic moment is generated in a sea, on a surface of the sea, or above the surface of the sea.

Optionally, the at least one magnetic moment generator is carried by a vehicle.

Optionally, the vehicle is configured to carry the at least one magnetic moment generator in an air above ground.

A measuring equipment for mapping geological structure of a formation on a side of a surface, includes: at least one magnetic moment generator for generating a magnetic moment to build up a magnetic field in the formation, the magnetic moment having a moment strength; at least one changer for changing the magnetic moment to change the magnetic field in the formation; at least one B/E-measuring unit for measuring the magnetic field and/or the change in the magnetic field; a recording device for recording at a recording time $t_{record}$ at least one record that includes at least a representation of the change in the magnetic field and/or a representation of the magnetic field measured by the at least one B/E-measuring unit; and a sequence generator configured for generating at least two sequences, each of the at least two sequences having at least one moment period, wherein for each of the at least two sequences, the measuring equipment is configured for generation of magnetic moments with different absolute values of moment strengths.

Optionally, a duration of the at least two sequences is less than 1 second.

Optionally, the sequence generator has a controller for alternating the absolute values of moment strengths and/or the moment periods.

Optionally, the sequence generator has a communication component for transmitting signals to/from the at least one magnetic moment generator, the at least one changer, the at least one B/E-measuring unit, or the recording device.

Optionally, the at least one magnetic moment generator has at least two separate sub-moment generators for respectively generating the magnetic moments in each of the at least two sequences.

Optionally, the at least one magnetic moment generator has a number of separate sub-moment generators for generating respective magnetic moments.

Optionally, the at least one B/E-measuring unit is in a position relative to the at least one magnetic moment generator, in which position an induction from the at least one magnetic moment generator in the at least one B/E-measuring unit is zero or minimal.

Optionally, the at least one magnetic moment generator is configured for generating the magnetic moment on a ground.

Optionally, the at least one magnetic moment generator is configured for generating the magnetic moment in air above a ground.

Optionally, the at least one magnetic moment generator is configured for generating the magnetic moment in a sea, on a surface of the sea, or above the surface of the sea.

Optionally, the at least one magnetic moment generator is carried by a vehicle.

Optionally, the at least one magnetic moment generator is carried by the vehicle in an air above ground.

A method for mapping geological structure of a formation on a side of a surface, includes: generating a magnetic moment using at least one magnetic moment generator to build up a magnetic field in the formation in an on-period, wherein the magnetic moment has a moment strength, and wherein the magnetic moment is positioned on another side of the surface; changing the magnetic moment to change the magnetic field; and making at least one record in a recording device at a recording time $t_{record}$ in an off-period, wherein the record includes at least a representation of the change in the magnetic field and/or a representation of the magnetic field obtained by a B/E-measuring unit; wherein the on-period is separated from the off-period by the act of changing the magnetic moment; wherein the acts of generating, changing, and making are associated with a first sequence; wherein the method comprises repeating one or more of the acts of generating, changing, and making for a second sequence, each of the sequences lasting a sequence period and comprising at least one moment period; and wherein the sequences are performed with different respective recording times $t_{record}$ and with respective magnetic moments that are at a same position or positions separated by a maximum distance of 50 m.

Optionally, at least one of the sequences is performed with a magnetic moment having an opposite sign to a magnetic moment in another one of the sequences.

Optionally, at least one of the sequences is performed with increasing or decreasing absolute values of moment strengths of magnetic moments.

Optionally, the first sequence is performed followed by the second sequence in which the second sequence has identical absolute values of moment strengths of magnetic moments as those of the first sequence, but with opposite signs.

Optionally, each of the sequences has identical, but opposite signed magnetic moments, the magnetic moments in each of the sequences are separated by a time close to or identical to a grid-period, or multiple thereof, or a natural fraction thereof.

Optionally, the method further includes processing the records from the first and second sequences in a computer to form a representation of the geological structure of the formation.

Optionally, the B/E-measuring unit is in a position relative to the at least one magnetic moment generator for at least the first sequence, in which position an induction from the at least one magnetic moment generator in the B/E-measuring unit is zero or minimal.

Optionally, the magnetic moment is generated on a ground.

Optionally, the magnetic moment is generated in air above a ground.

Optionally, the magnetic moment is generated in a sea, on a surface of the sea, or above the surface of the sea.

Optionally, the at least one magnetic moment generator is carried by a vehicle.

Optionally, the vehicle is configured to carry the at least one magnetic moment generator in an air above ground.

A measuring equipment for mapping the geological structure of a formation on a side of a surface, includes: at least one magnetic moment generator for generating a magnetic moment to build up a magnetic field in the formation, the magnetic moment having a moment strength; at least one changer for changing the magnetic moment to change the magnetic field in the formation; at least one B/E-measuring unit for measuring the magnetic field and/or the change in the magnetic field; and a recording device for recording at a recording time $t_{record}$ at least one record that includes at least a representation of the change in the magnetic field and/or a representation of the magnetic field measured by the at least one B/E-measuring unit; wherein the at least one magnetic moment generator, the at least one B/E-measuring unit, and the recording device are configured to execute a first sequence; wherein the at least one magnetic moment generator, the at least one B/E-measuring unit, and the recording device are configured to execute a second sequence; wherein each of the first and second sequences having at least one moment period, and wherein the measuring equipment is configured for executing the first and second sequences at different times t at a same position or at positions that are separated by a maximum distance of 50 m.

Optionally, the measuring equipment further includes a controller for alternating absolute values of moment strengths associated with the first and second sequences, and/or the moment periods.

Optionally, the measuring equipment further includes a communication component for transmitting signals to/from the at least one magnetic moment generator, the at least one changer, the at least one B/E-measuring unit, or the recording device.

Optionally, the at least one magnetic moment generator has at least two separate sub-moment generators for respectively generating magnetic moments in the first and second sequences.

Optionally, the at least one magnetic moment generator has a number of separate sub-moment generators for generating respective magnetic moments.

Optionally, the at least one B/E-measuring unit is in a position relative to the at least one magnetic moment generator, in which position an induction from the at least one magnetic moment generator in the at least one B/E-measuring unit is zero or minimal.

Optionally, the at least one magnetic moment generator is configured for generating the magnetic moment on a ground.

Optionally, the at least one magnetic moment generator is configured for generating the magnetic moment in air above a ground.

Optionally, the at least one magnetic moment generator is configured for generating the magnetic moment in a sea, on a surface of the sea, or above the surface of the sea.

Optionally, the at least one magnetic moment generator is carried by a vehicle.

Optionally, the at least one magnetic moment generator is carried by the vehicle in an air above ground.

A geophysical map of an underground obtained by processing records from first and second sequences obtained by a method for mapping geological structures of a formation on a side of a surface, the method includes: generating a magnetic moment using at least one magnetic moment generator to build up a magnetic field in the formation in an on-period, wherein the magnetic moment has a moment strength, and wherein the magnetic moment is positioned on another side of the surface; changing the magnetic moment to change the magnetic field; and making at least one record in a recording device at a recording time $t_{record}$ in an off-period, wherein the record includes at least a representation of the change in the magnetic field and/or a representation of the magnetic field obtained by a B/E-measuring unit; wherein the on-period is separated from the off-period by the act of changing the magnetic moment; wherein the acts of generating, changing, and making are associated with a first sequence; and wherein the method comprises repeating one or more of the acts of generating, changing, and making for a second sequence, each of the sequences lasting a sequence period and comprising at least one moment period, and wherein each of the sequences is performed with different absolute values of moment strengths of magnetic moments and/or different on-time periods of magnetic moments.

A geophysical map of an underground obtained by processing records from first and second sequences obtained by a method for mapping geological structures of a formation on a side of a surface, the method includes: generating a magnetic moment using at least one magnetic moment generator to build up a magnetic field in the formation in an on-period, wherein the magnetic moment has a moment strength, and wherein the magnetic moment is positioned on another side of the surface; changing the magnetic moment to change the magnetic field; and making at least one record in a recording device at a recording time $t_{record}$ in an off-period, wherein the record includes at least a representation of the change in the magnetic field and/or a representation of the magnetic field obtained by a B/E-measuring unit; wherein the on-period is separated from the off-period by the act of changing the magnetic moment; wherein the acts of generating, changing, and making are associated with a first sequence; wherein the method comprises repeating one or more of the acts of generating, changing, and making for a second sequence, each of the sequences lasting a sequence period and comprising at least one moment period; and wherein the sequences are performed with different respective recording times $t_{record}$ and with respective magnetic moments that are at a same position or positions separated by a maximum distance of 50 m.

A geophycial map of an underground obtained by processing records obtained by a measuring equipment, wherein the measuring equipment is for mapping geological structure of a formation on a side of a surface, and includes: at least one magnetic moment generator for generating a magnetic moment to build up a magnetic field in the formation, the magnetic moment having a moment strength; at least one changer for changing the magnetic moment to change the magnetic field in the formation; at least one B/E-measuring unit for measuring the magnetic field and/or the change in the magnetic field; a recording device for recording at a recording time $t_{record}$ at least one record that includes at least a representation of the change in the magnetic field and/or a representation of the magnetic field measured by the at least one B/E-measuring unit; and a sequence generator configured for generating at least two sequences, each of the at least two sequences having at least one moment period, wherein for each of the at least two sequences, the measuring equipment is configured for generation of magnetic moments with different absolute values of moment strengths.

A geophycial map of an underground obtained by processing records obtained by a measuring equipment, wherein the measuring equipment is for mapping geological structure of a formation on a side of a surface, and includes: at least one magnetic moment generator for generating a magnetic moment to build up a magnetic field in the formation, the magnetic moment having a moment strength; at least one changer for changing the magnetic moment to change the magnetic field in the formation; at least one B/E-measuring unit for measuring the magnetic field and/or the change in the magnetic field; and a recording device for recording at a recording time $t_{record}$ at least one record that includes at least a representation of the change in the magnetic field and/or a representation of the magnetic field measured by the at least one B/E-measuring unit; wherein the at least one magnetic moment generator, the at least one B/E-measuring unit, and the recording device are configured to execute a first sequence; wherein the at least one magnetic moment generator, the at least one B/E-measuring unit, and the recording device are configured to execute a second sequence; wherein each of the first and second sequences having at least one moment period, and wherein the measuring equipment is configured for executing the first and second sequences at different times t at a same position or at positions that are separated by a maximum distance of 50 m.

Other and further aspects and features will be evident from reading the following detailed description.

DESCRIPTION OF THE DRAWING

The above and other features and advantages will become readily apparent to those skilled in the art by the following detailed description of exemplary embodiments thereof with reference to the attached drawings, in which.

DETAILED DESCRIPTION

Various embodiments are described hereinafter with reference to the figures. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Figure 1:
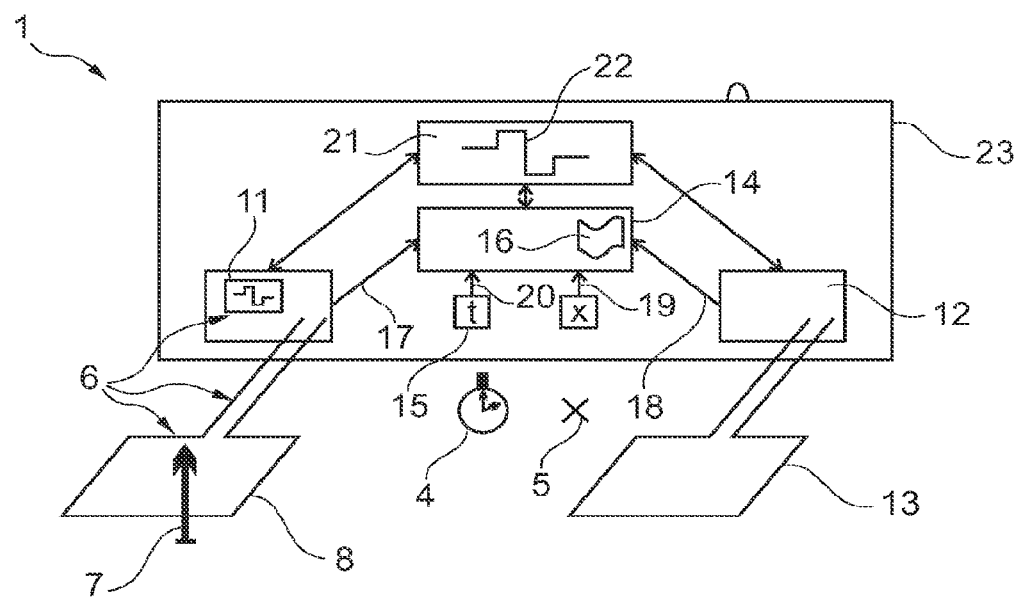
FIG. 1 shows a schematic diagram of measuring equipment for mapping the geological structure on one side of a surface.
Figure 1:
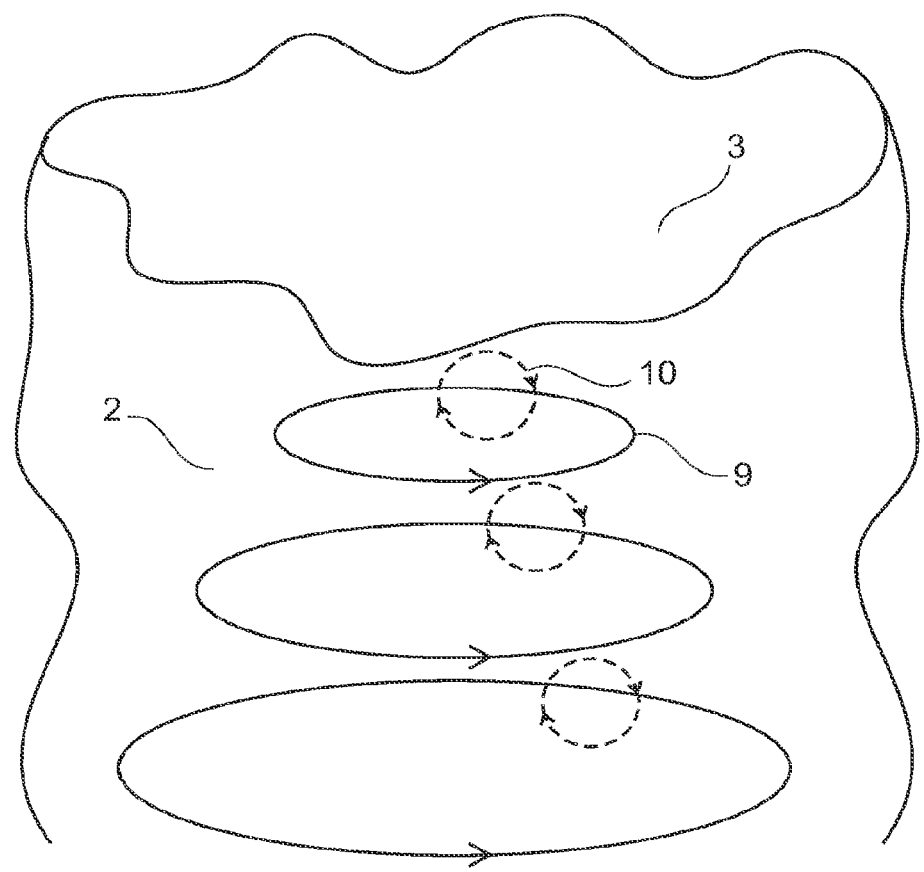

FIG. 1 shows an embodiment of a measuring equipment 1 for mapping the geological structure of a formation 2 on one side of a surface 3. The measuring equipment 1 is on the other side of the surface 3. Typically, the measuring equipment is carried by a vehicle such as a helicopter, but any vehicle could be used.

The measuring equipment 1 is at a given time 4 positioned on the other side of the surface 3 at a position 5.

The measuring equipment 1 has a magnetic moment generator 6 configured for generating a magnetic moment 7. In this embodiment the magnetic moment generator 6 has at least one transmitter coil 8.

When the magnetic moment 7 is generated on the other side of the formation 2, currents 9 are inducted in the formation 2 generating a magnetic field 10 which strength depends on the currents 9 and the conductivity representing the geological structure in the formation 2.

The currents 9 induced in the formation 2 arise due to a change in the magnetic moment 7. This change is done by at least one changing means 11 for changing the magnetic moment 7 thereby changing the magnetic field 10. The changing means 11 can be a switch.

The magnetic field 10 is measured by a B/E-measuring unit 12. The B/E-measuring unit 12 can be a receiver coil 13 located where the mutual inductance with the transmitter coil is zero or minimal.

There is a recording device 14 configured for recording at a recording time 15 $t_{record}$ at least one record 16 and store the record in a memory. The record 16 includes at least a representation 17 of the change in the magnetic field 10 and a representation 18 of the magnetic field 10 obtained by the B/E-measuring unit 12.

The record 16 further include a representation 19 of the position 5 and a representation 20 of the time 15.

The measuring equipment 1 further includes a sequence generator 21. The sequence generator 21 is configured for generating at least two sequences 22 that controls the moment generator 6, the B/E-measuring unit 12 and the recording device 14 via connections.

The measuring equipment 1, or at least part of the equipment, is contained in a box 23 with means for connecting to a vehicle or vessel. The box is finished according to the particular medium such as air or water.

Figure 2:
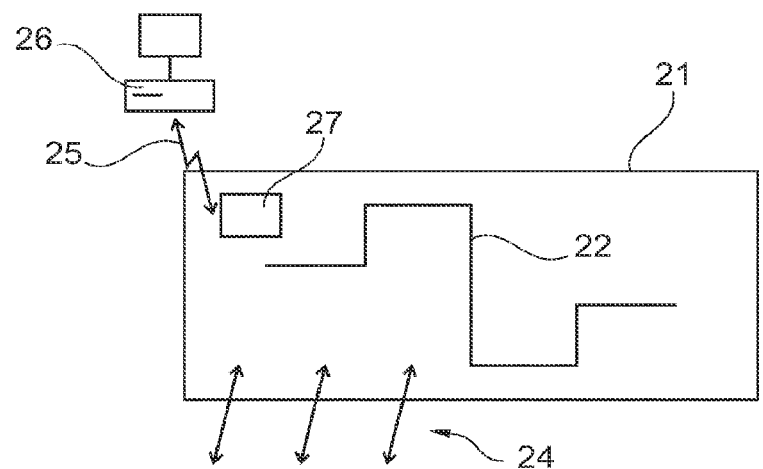
FIG. 2 shows a schematic diagram of a sequence generator.
Figure 2:
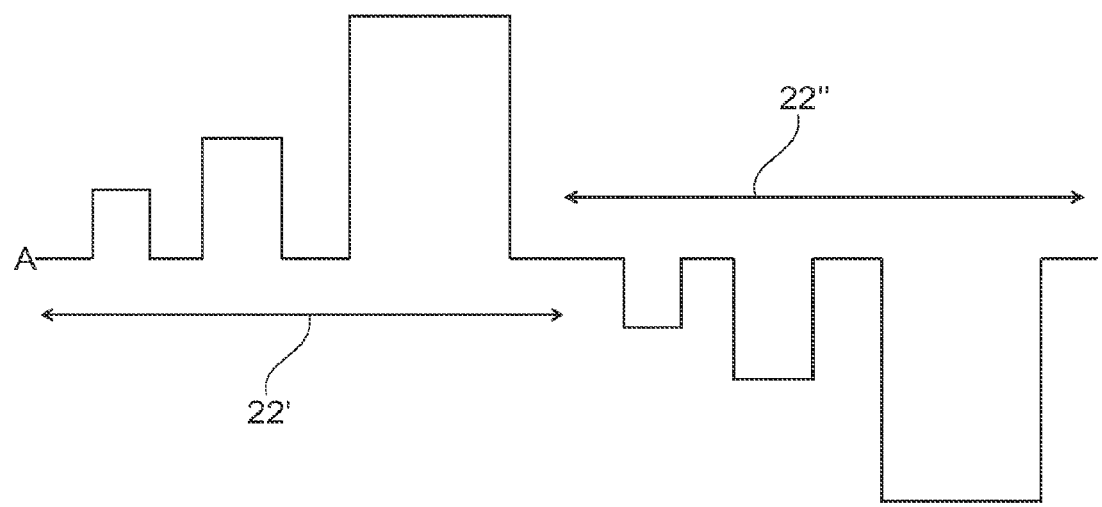

FIG. 2 shows a schematic view of the sequence generator 21 configured for generating a sequence 22. The sequence generator 21 has connection and/or communication means 24 for communicating with the moment generator 6, the B/E-measuring unit 12, the recording device 14 and other auxiliary units such as a timer and a positioning unit such as a General Position System unit. The connection means 24 can be galvanic cables or where appropriate optical cables.

The sequence generator 21 has a communications link 25 to a computational device 26 located outside the box 23. The sequence generator 21 has means for sending and receiving instructions from the computational device 26. Furthermore, the sequence generator 21 in the shown embodiment has at least one computational unit 27 for processing data and generating, altering, editing and/or executing sequences 22.

The figure furthermore illustrates an output A of the sequence generator 21. The output A consists of a first sequence 22' and a second sequence 22".

In one embodiment, the first sequence consists of a series discrete and distinct signal levels with that will result or translate into a series of magnetic moments 7 according to the configuration disclosed in FIG. 1. In this embodiment, the distinct signal levels increase in value and will translate into increasing absolute values of moment strengths. The temporal space between each distinct signal level increase in time as will the timing between magnetic moments 7.

The first sequence is followed by a second sequence that consists of a series of signal levels identical to the series in the first sequence except that they have opposite signs.

A person skilled in the art will find it natural to explore or use different signal shapes to translate into the magnetic moments 7. The low levels can be offset and the shape can be saw tooth like or any other shape with a one to one correspondence between the signal level and the moment generator 6, recording device 14, and the B/E-unit 12 or any other piece of equipment.

Figure 3:
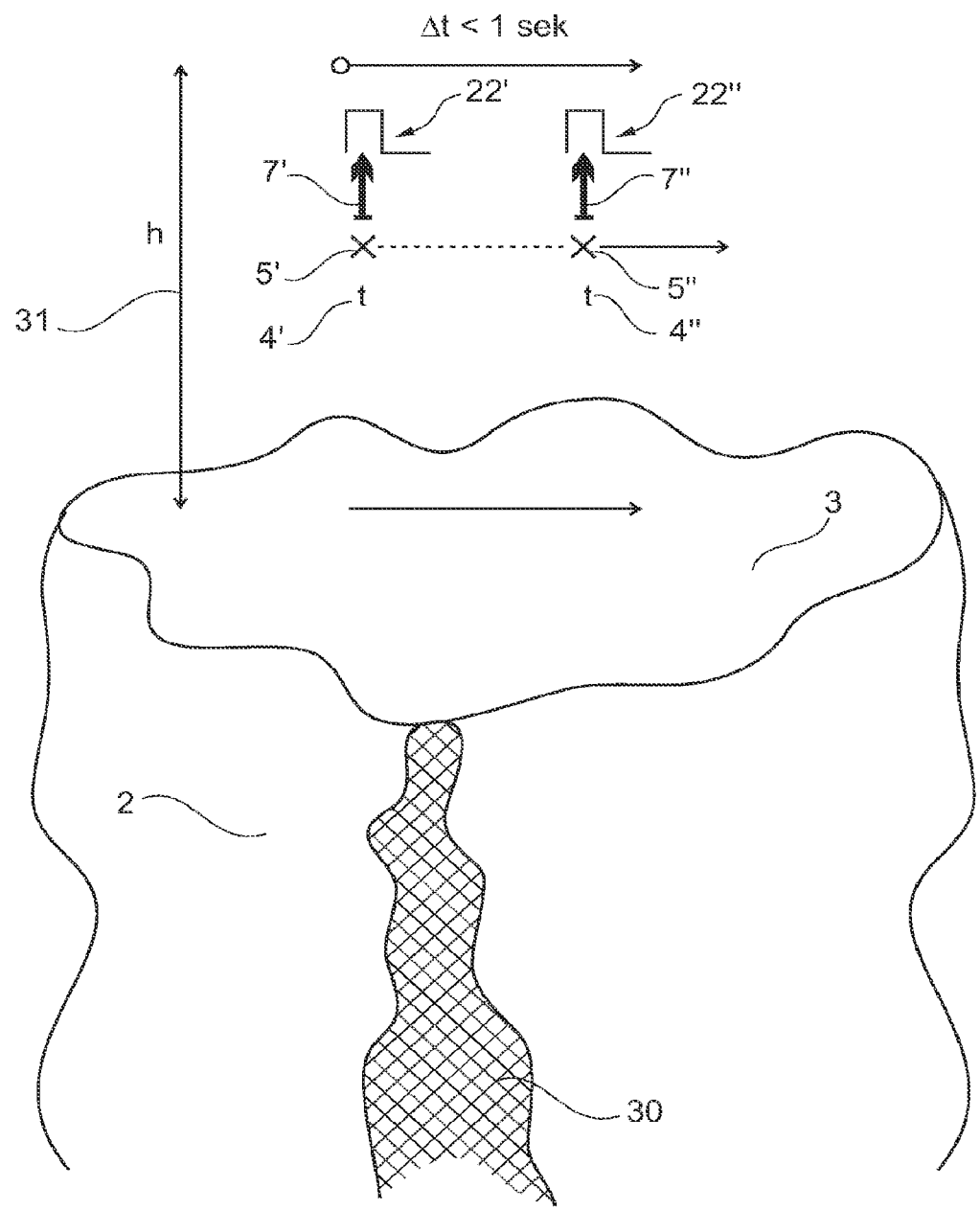
FIG. 3 shows a schematic diagram of a first magnetic moment being fired at a first position and a second magnetic moment being fired at a second position.

FIG. 3 shows the formation 2 with a target 30 with limited spatial extension. The target is a geological structure and can be an ore or a reservoir. The figure illustrates the measuring equipment 1 being translocated essentially in a plane in a height h 31 above the surface 3. A first sequence 22' is performed, transmitted, or fired at a first position 5' at a first time 4' and a second sequence 22" is performed at a second position 5" at a second time 4" within a time period of less than 1 second. Likewise the a third sequence 22''' can be fired within a time period less than 1 second from the second sequence 22", and so forth.

Thereby the target 30 can be detected. Even a target 30 such as an ore with limited spatial extend can be detected.

Having a sequence using several magnetic moments 7', 7" according to this disclosure will also allow for a better vertical resolution of the survey and/or deeper resolution of the survey, i.e. deeper into the formation survey.

A moment 7' with smaller moment strength will turn-off faster and thereby the decay from the faster decaying currents 9' in the layer close to the surface 3 can be measured. Likewise a moment 7" with larger moment strength will turn-off slower and thereby the decay from the slower decaying currents 9" deeper areas of the formation 2 can be measured.

Further using magnetic moments 7', 7" with opposite signs will increase the signal to noise ratio thereby further improving the signal quality.

Further using magnetic moments 7', 7" with identical, but opposite signs and separated in time by a time close to or identical to a grid-period, or any other period as per construction, or multiples or natural fractions there-off will reduce industrial noise components thereby further improving the signal quality.

Figure 4:
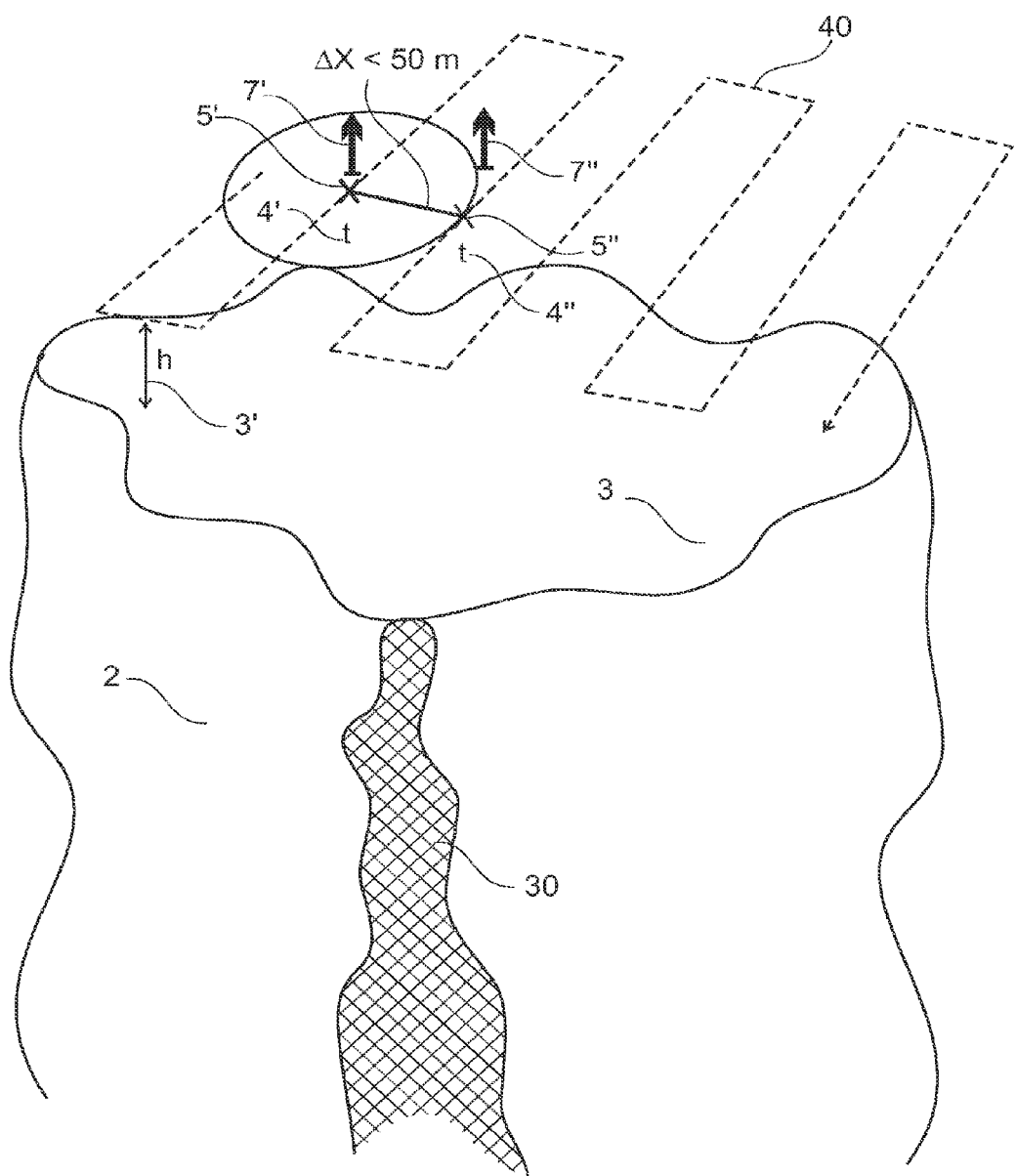
FIG. 4 shows a schematic diagram of a first magnetic moment being fired at a first position and a second magnetic moment being fired at a second position.

FIG. 4 shows an example of a survey pattern 40 of a movement of the measuring equipment 1 on one side of a formation 2 with an anomalous geological structure such as an ore 30.

The sequence generator 12 is configured for generating sequences and firing sequences 22 along the path of the survey pattern 40 in such a way that at least two sequences 22', 22' with magnetic moments and recordings according to this disclosure so that the firing of the second sequence 22" takes place in a position 5" that is within a maximum distance of 50 m from the position 5' of the first sequence 22'. In a special case the second position 5" is identical to the first position 5'.

In one embodiment the survey pattern 40 is designed with a path with return points that are within the distance of 50 m and given as an input to the sequence generator 21.

In one embodiment, the survey pattern 40 is generated by the sequence generator 21 that generates an output to be used to guide the movement of the measuring equipment 1.

In one embodiment, the survey pattern 40 is generated, designed or a combination thereof, in a way that indications of an anomalous geological structure such as an ore 30 will generate a survey pattern 40 and sequences 22, 22', 22" . . . that zooms in on a particular area.

Thereby starting with a survey pattern 40 that is coarse, this allows for the measuring equipment to return to a particular area for a multi-resolution survey using multiple magnetic moments to obtain a detailed geological survey. This will save resources as compared to having a fine survey pattern 40 over the whole formation 2 from the start.

One particular example is an airborne survey where the measuring equipment 1 is flown by a helicopter, which is by nature a resourceful operation.

Figure 5:
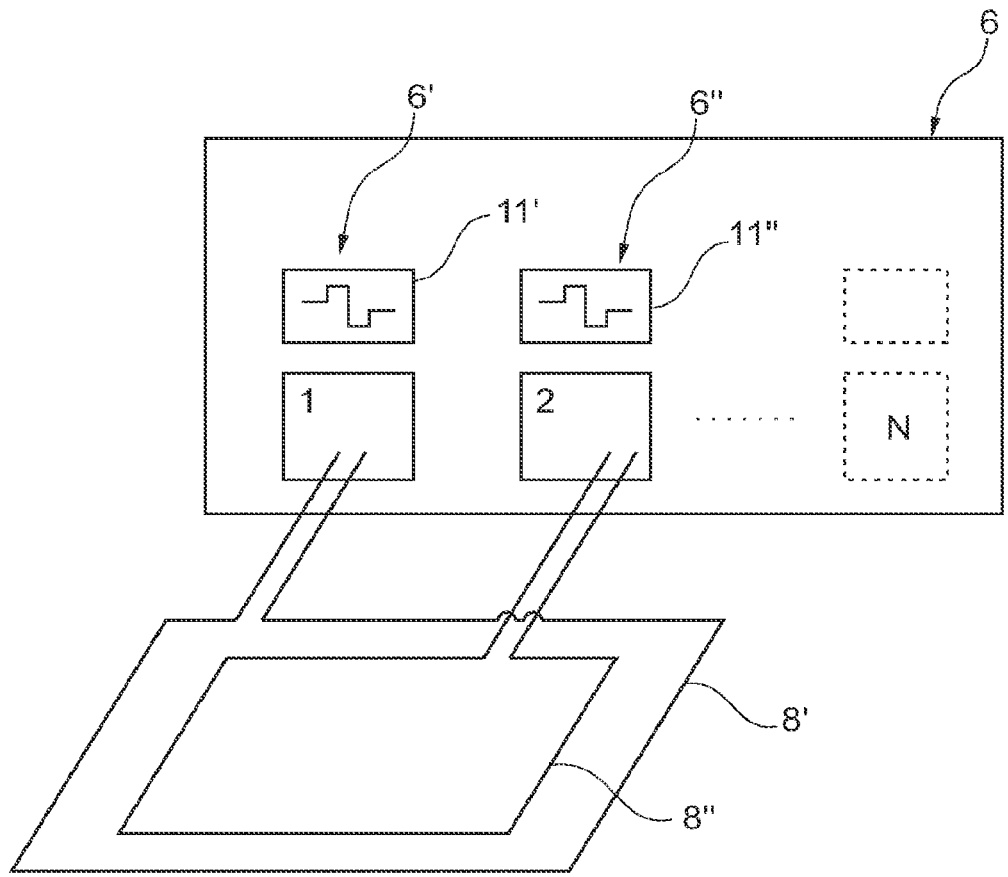
FIG. 5 shows a schematic diagram of a magnetic moment generator comprising at least two separate sub-moment generators.
Figure 5:
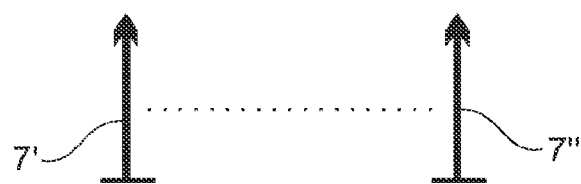

FIG. 5 shows an embodiment of the magnetic moment generator 6 with at least two individual and separated sub-moment generators 6', 6" each configured to generating magnetic moments 7' and 7", respectively.

In the embodiment shown, the sub-moment generators 6', 6" each have changing means 11', 11" for changing the magnetic moment 7', 7" and separate transmitter coils 8', 8". One way of generating the magnetic moment 7 is by having a current source and connected to the transmitter coils 8 and switch to cut-off the current as the changing means 11 thereby the abrupt change in the current will generate a magnetic moment 7.

Figure 6:
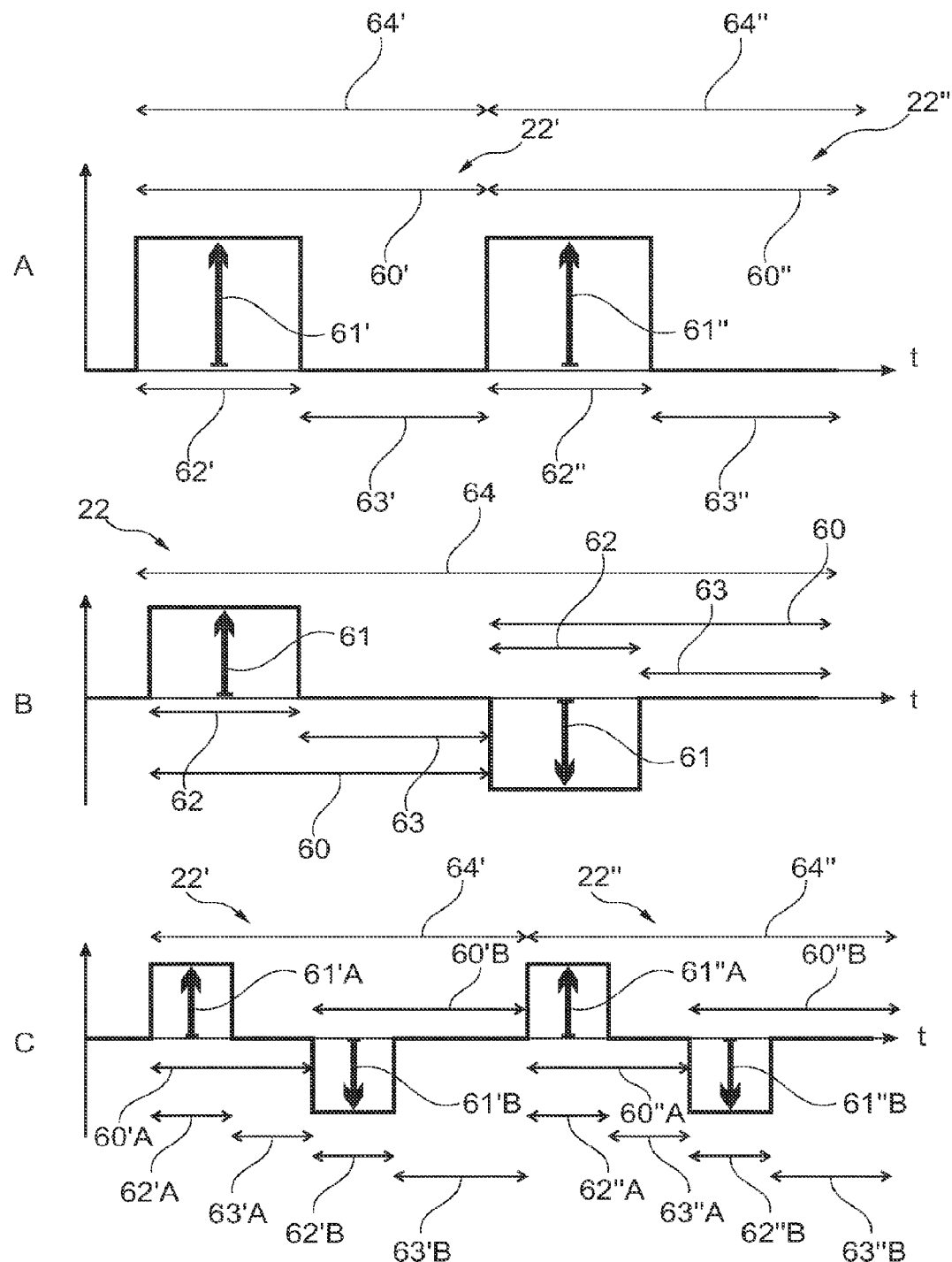
FIG. 6 shows definitions and examples of series of magnetic moments.

FIG. 6 shows examples of sequences 22.

Example A shows a first sequence 22' followed by a second sequence 22".

Generally, each sequence 22 has an event or a moment period 60 that relates to the magnetic moment 7 and the B/E-measuring unit 12, the recording device 14 by determining the workings and interrelations between these units.

The moment period 60 has signal level that determines or translates into a moment strength 61 which signal level lasts for a moment period or an on-time period 62 followed by an off-time period 63. The on-time period 62 and the off-time period 63 at least constitute a sequence period 64.

It is during a sequence period 64 that the magnetic moment 7 is established and that the magnetic field 10 is build up in the formation 2 and measured by the B/E-measuring unit 12 and various recordings 17, 18, 19, 20 are made by the recording device 14 according to the disclosure and the general knowledge of the person skilled in the art.

The first sequence 22' has a signal level that determines the moment strength 61, which in this case is a first moment strength 61' that lasts for a first on-time period 62' and is followed by a first off-time period 63'. Likewise, the second sequence 22" has a signal level that determines the second moment strength 61" that lasts for a second on-time period 62" followed by a second off-time period 63".

Example B shows a sequence 22 lasting a sequence period 64. The sequence 22 first has an on-time period 62, then an off-time period 63, then an on-time period 62, and an off-time period 63. The signal level during each on-time period 62 determines the magnetic moment strength 61. The signal levels during the on-time periods 62 have the same absolute values but opposite signs thereby resulting in magnetic moments 7 with the same absolute magnetic moment strengths 61, but with opposite signs.

Example C shows a first sequence 22' and a second sequence 22".

The first sequence 22' has a first sequence period 64' and the second sequence 22" has a second sequence period 64". In this embodiment the first sequence period 64' equals the second sequence period 64". In this embodiment the second sequence 22" immediately follows the first sequence 22'.

The first sequence 22' has a shape for generating a moment period 60'A with a positive level resulting in a positive moment strength 61'A during the on-time period 62'A, which is followed by the off-time period 63'A. The first sequence 22' has a further moment period 60'B with a negative level resulting in a negative (with opposite sign or orientation) moment strength 61'B compared to the moment strength 61'A. The negative moment strength 61'B is performed during the on-time period 62'B followed by the off-time period 63'B.

In this embodiment the timing between the positive moment strength 61'A and the negative moment strength 61'B is adjusted to a grid period such as 50 Hz by adjusting the moment period 60'A thereby the grid-noise in the response from the positive and negative moments will cancel out each other.

The signal level in the second sequence 22" is identically shaped to the signal level in the first sequence 22' thereby resulting in moments strengths 61"A, 61"B distributed with in times identical to those from the first sequence 22' as is evident from the figure.

This can be achieved by configuring the measuring equipment with a switch performing alternating signed pulses.

Figure 7:
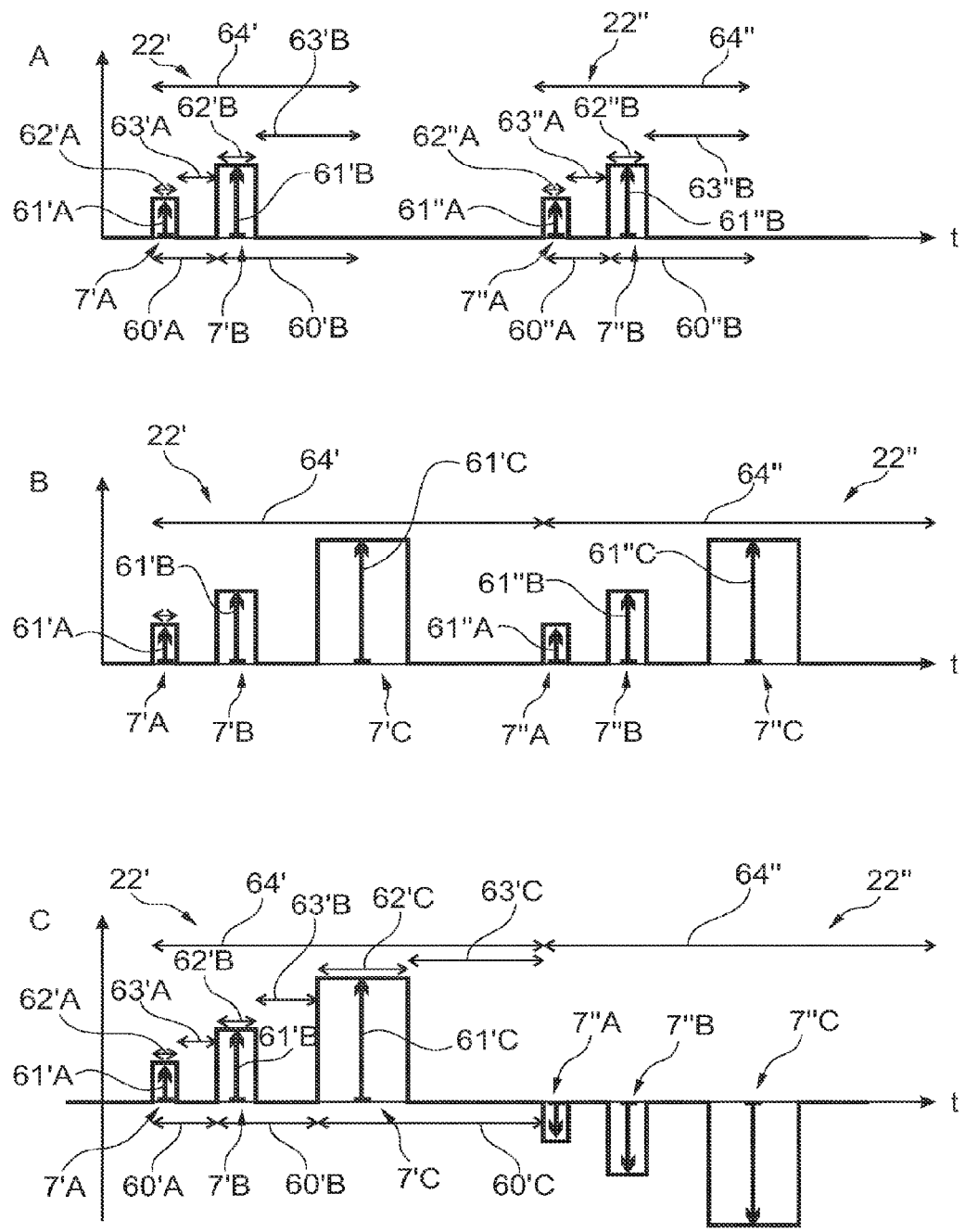
FIG. 7 shows examples of sequences of magnetic moments.
Figure 7:
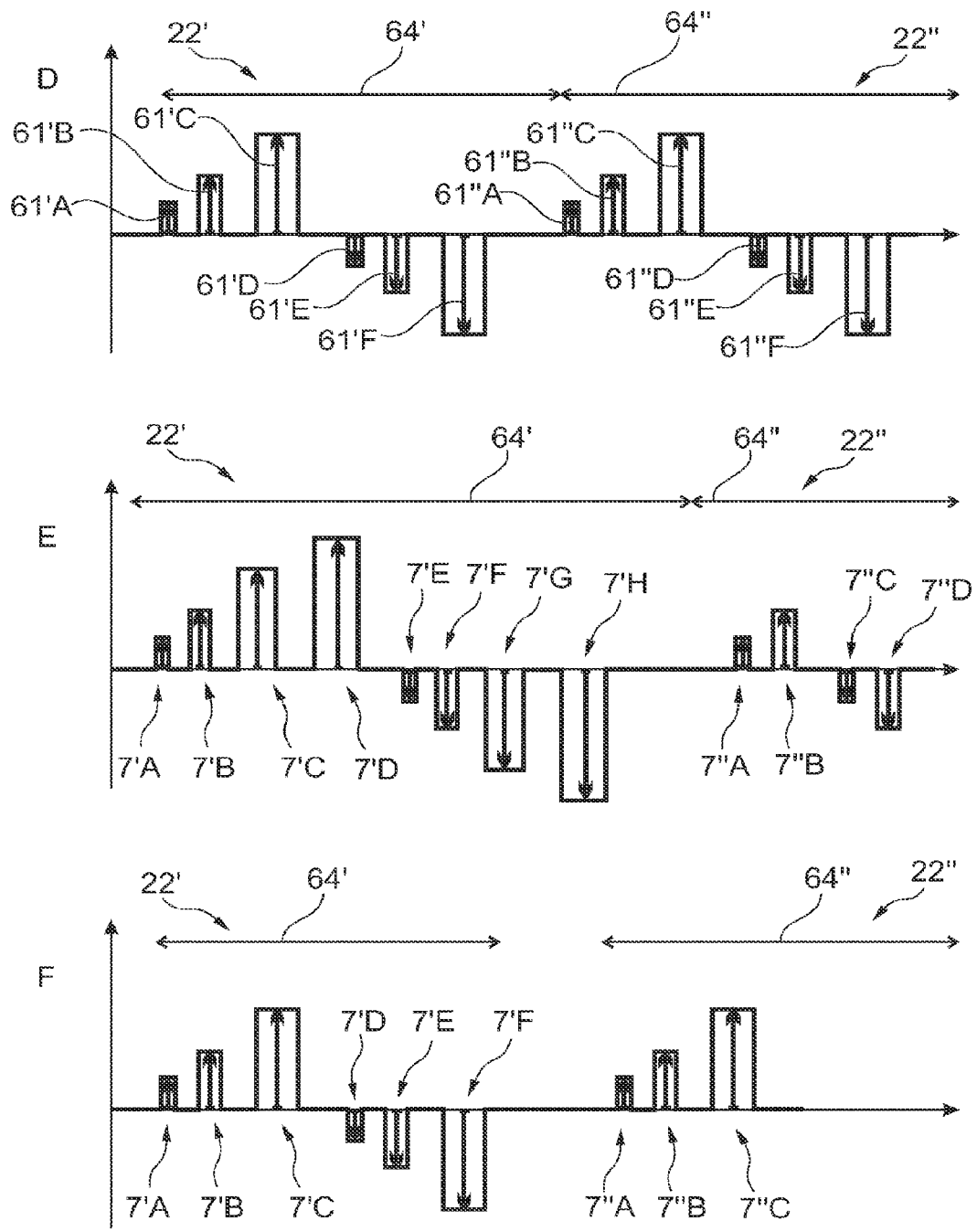

FIG. 7 shows examples of sequences 22', 22", . . . with moments according to some embodiments.

The first sequence 22' with a sequence period 64' has two moments 7'A and 7'B with moments strengths 61'A and larger than that 61'B, respectively. The first moment 7'A has a moment period 60'A and an on-time period 62'A and an off-time period 63'A. Likewise, the second period 7'B has a moment period 60'B and an on-time period 62'B and an off-time period 63'B. In this embodiment the on-time periods 62'A, 62'B and the off-time periods 63'A and 63'B adds-up to the first sequence period 64.

Separated in time from the first sequence 22' there is a second sequence 22" with a second sequence period 64" with moments 7"A, 7"B identical to the moments in the first sequence 22".

The measuring equipment 1 and the method for mapping the geological structure is configured so that it is capable of performing sequences 22' and 22" where the time between the beginning of the first sequence period 64' and end of the second sequence period 64" is less than 1 second.

According to some embodiments, the two sequences 22', 22" are executed at different times, but within a distance of a maximum of 50 meters.

Example B shows a variation of sequences 22', 22" from example A. first sequence 22' with a sequence period 64'.

The first sequence 22' has moments 7'A, 7'B, and 7'C each with a moment strength 61' ordered so that the absolute values 61'A<61'B<61'C. Similarly, the second sequence 22" has moments 7"A, 7"B, and 7"C each with a moment strength 61" ordered so that the absolute values 61"A<61"B<61"C, and in this embodiment with identical values to the moment strengths 61'A,B,C.

The measuring equipment 1 and the method for mapping the geological structure is configured so that it is capable of performing sequences 22' and 22', where the first sequence period 64' consecutively is followed by a second sequence 22" with a second sequence period 64", where the first and second sequence periods 64', 64" adds up to less than 1 second.

According to some embodiments, the two sequences 22', 22" are executed at different times, but within a distance of a maximum of 50 meters.

Example C shows a first sequence 22' and a second sequence 22".

The first sequence 22' lasts a sequence period 64' and has multiple on-time periods 62'A, 62'B, 62'C with signal levels resulting in increasing magnetic moment strengths 61'A<61'B<61'C each followed by increasing off-time periods 63'A<63'B<63'C. In short the first sequence fires multiple magnetic moments 7'A, 7'B, 7'C increasing in size.

The first sequence 22' is followed by a second sequence 22" lasting a sequence period 64". In this embodiment, the second sequence 22" is identical to the first sequence 22' except that the signal levels are of opposite signs thereby resulting in multiple magnetic moments 7"A, 7"B, 7"C.

According to some embodiments, the two sequences 22', 22" are executed within a period less than 1 second. In one embodiment there can be a time delay between the two sequences 22', 22".

According to some embodiments, the two sequences 22', 22" are executed at different times, but within a distance of a maximum of 50 meters.

In brief and in continuation of examples A, B, and C, figures D, E, and F each a first and a second sequence 22', 22" with sequence periods 64', 64".

Example D shows sequences resulting from measuring equipment or a method for mapping the geological structure configured to perform a first sequence with moments with moment strengths 61' arranged so that the moment strengths 61'A<61'B<61'C are followed by similar subsequence with moments of the same moment strengths, but with opposite signs/orientations 61'D>61'E>61'F.

The sub-sequences 61'A<61'B<61'C and 61'D>61'E>61'F are timed so as to cancel out contributions from the grid periods such as 50 or 60 Hz according to the location of using the measuring equipment or performing the measuring method.

The first sequence 22' is followed by a second sequence 22" with identical moments as those moments in the first sequence 22'.

Example E shows sequences resulting from measuring equipment or a method for mapping the geological structure that is configured to perform or fire a moments in a first sequence 22' with a sub-moments 7'A, 7'B, 7'C, 7'D with relative moments strengths as readily observed from the figure followed by an subsequence of sub-moments 7'E, 7'F, 7'G, 7'H with opposite signs/orientations. Again these two sub-sequences are timely spaced so as to cancel out grid noise. The larger number of moments results in a more detailed vertical (into the depth) resolution.

The first sequence 22' is followed by a second sequence 22" with sub-sequences with moments 7"A, 7"B and oppositely signed/orientated, but identical moments 7"C, 7"D again spaced in time so as to cancel out contributions from grid noise. As is readily seen from the example, the moments 7' in the first sequence 22' are different from the moments in the second sequence 22". Thereby different vertical or timely surveys are performed, which will allow for interpolating the data and applying more advanced analyses.

By using sequences such as these, the survey records will contain some more redundant information thereby allowing subsequent analyses to remove systematic errors in from the system.

In a similar vein to the sequences of moments in example E then example F shows a first sequence 22' similar to the first sequence from example D, but followed by a second sequence 22" with only the first subsequence, the positive singed moments 7"A, 7"B, 7"C. By performing asymmetric sequences like this, it will be possible to obtain or extract information about the contribution from the grid noise or other industrial periods.

Not shown as an example is a sequence with three moments 7A, B, C each with a moment strength 61A, B, C and where 61A>61C>61B. This sequence is paired by a second sequence with the same shape and times, but with opposite signs.

It is understood that the person skilled in the art will feel inclined to experiment, construct patterns of moments in sequences and to configure the measuring equipment 1 or design specific measuring methods by altering the moment generators, the recording device, and the B/E-measuring unit according to the sequence designs. The person skilled in the art can use multiple transmitter coils with both separate current generators and switches if so needed or use a single transmitter coil and a single current generator, but will a switch arrangement for performing or firing moments of different times.

Figure 8:
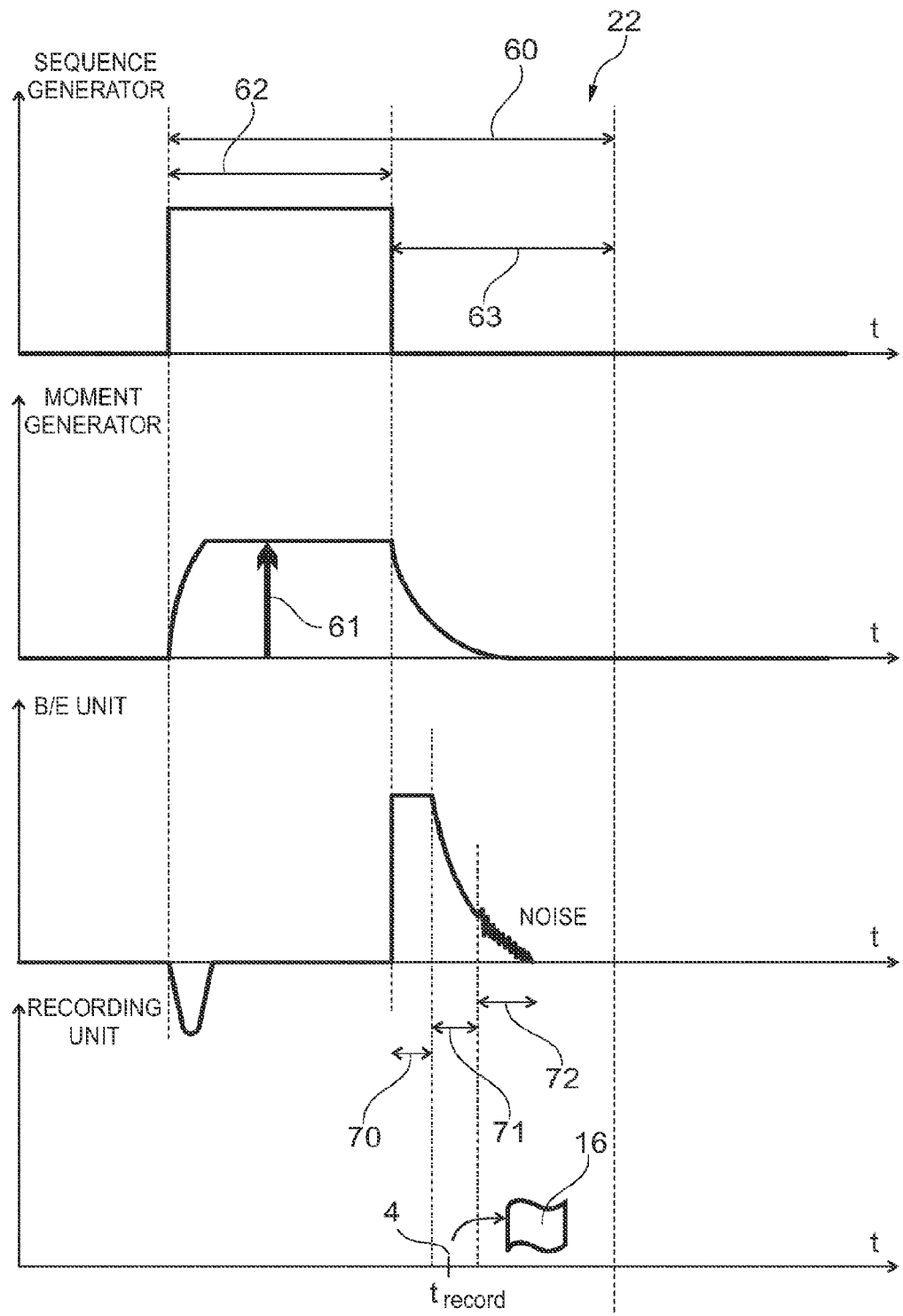
FIG. 8 shows signal and timing relations between the sequence generator, the moment generator, the B/E-unit, and the recording unit.

FIG. 8 shows with reference to the previous figures a signal from the sequence generator 21, a very simple sequence 22, with the moment period 60, the on-time period 62 and a signal level that will translate into a magnetic moment 7 with the moment strength 61. The on-time period 62 is followed by the off-time period 63.

The sequence generator 21 controls via control means 24 the moment generator 6, the B/E-measuring unit 12, and the recording unit 14 that are shown aligned with the signal generated by the sequence generator 21.

At the onset, the rising edge, of the signal during the on-time period the moment generator 6 is configured to build up a magnetic moment. In one embodiment the magnetic moment 7 is made by applying a current to a transmitter coil 8, which is seen to build up to the magnetic moment strength 61 according to the level from the sequence generator 21. At the falling edge of the signal during the transition between the on-time period 62 and the off-time period 63, the current is abruptly switched off and the magnetic moment decays.

During the built-up and decay, the magnetic field 10 in the formation 2 responds accordingly to the geological structures in the formation. This is measured by the B/E-measuring unit 12, where the change in the magnetic moment strength 61 at the beginning of the on-time period 62 results in a signal level in the B/E-measuring unit 12. Relevant to obtaining information about the geological structure in the formation 2 is the magnetic field 10 after the on-time period 62.

After switching off the magnetic moment 7 there is an instant rise in the magnetic field 10 which last for in a so-called current turn-off period 70, which when using semiconductors to switch off a current in the transmitter coil essentially is an avalanche period.

After this period the signal level of the B/E-measuring unit decays and there is a window for performing a recording. This is the recording period 71. The signal level of the B/E-measuring unit further decays and reaches a noise level period 72 unsuitable for using the recording.

During the recording period 71, the recording unit 14 at a time t record 4 makes a record 16.

This scheme is illustrative and it is only natural for the person skilled in the art to way the timing and to insert the required triggers and delays to get the appropriate record 16. In most cases some adjustment and experimentation with the actual delays is expected, but within the skills of such person. Likewise the person skilled in the art will find it natural to experiment with the magnetic moment strengths 61 and the amplification levels i.e. the sensitivity of the B/E-measuring unit 12 to obtain a suitable signal to noise level and a recording period 71 with a suitable length.

Figure 9:
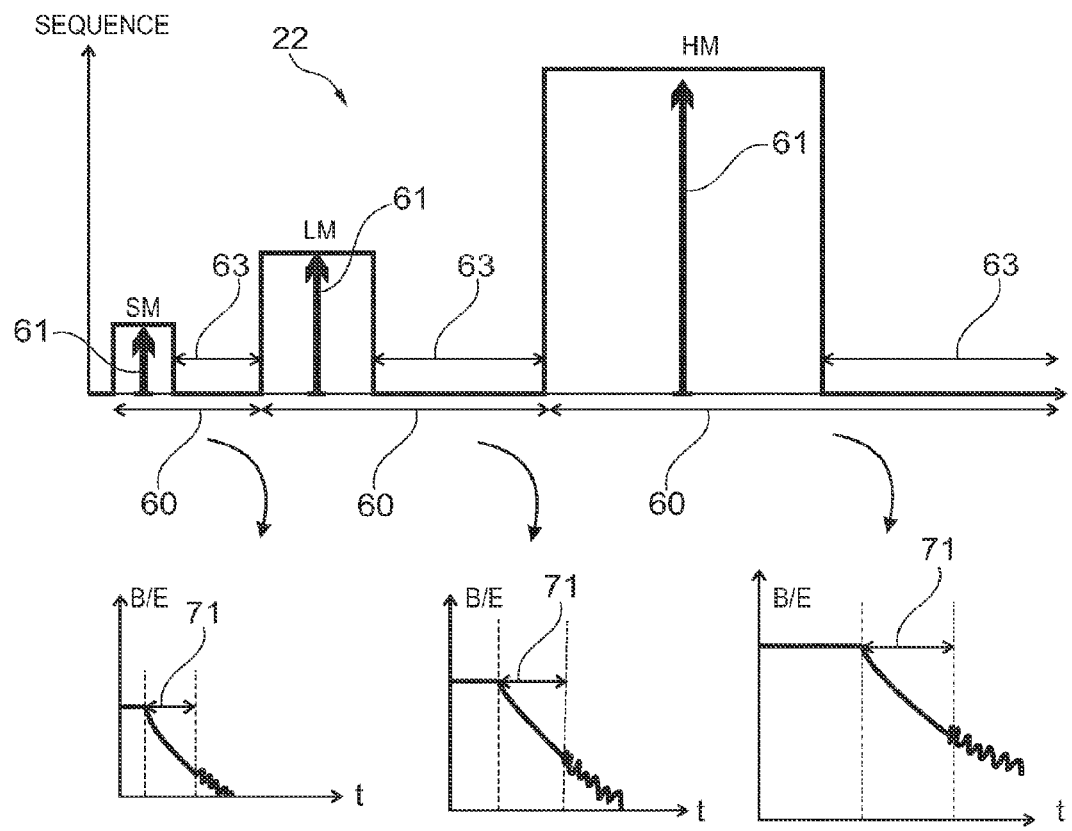
FIG. 9 shows a sequence with multiple moments corresponding measuring periods and the stacking of measurements representing different resolutions.
Figure 9:
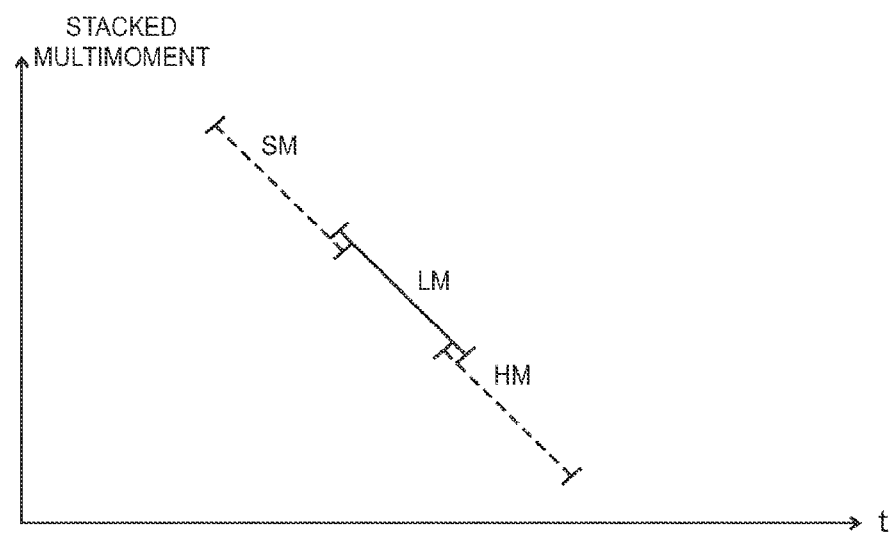

The record 16 will contain information about the time 4, the position 5, the magnetic moment strength 61, the magnetic field 10 in a representation from the B/E-measuring unit 12 and/or other quantities or sub-sets thereof FIG. 9 shows a sequence 22 for generating multiple magnetic moments 61 termed Small Moment (SM), Large Moment (LM), and Huge Moment (HM) each lasting a moment period 60. By the naming and the order of the show example, it is understood that the moment strengths relate so that SM<LM<HM. Likewise it is seen that the off-periods 63 last longer for HM than for LM than for SM.

Each moment with moment strength 61 will translate into a response from the formation 2 in a representation 18 from the B/E-measuring unit 12 recorded during the recording period 71 for each of the moments SM, LM, and HM.

The records 16 for each of the moments SM, LM, and HM contains information about the target 30 at early times, medium times, and late times respectively.

Furthermore the records 16 for each of the moments SM, LM, and HM contain information about the target 30 at different depths providing a detailed vertical (for a ground) resolution. The recording 16 from the moment SM provides information about a near surface target 30, the recording 16 from the moment HM provides information about a deep surface target 30, and recording 16 from the moment LM provides information about the target 30 between the near and deep surface targets.

The recordings 16 associated to each of the moments SM, LM, and HM can be stacked to provide continuous detailed information about the target 30 in time and without "holes" in the data. Such stacking of multiple recordings from moments provides a higher vertical resolution or a higher in depth resolution of a target 30 in the formation 2.

Having configured the measuring equipment 1 to perform a second sequence 22" with multiple moments at a different time whilst moving the measuring equipment 1 as described will allow for a higher horizontal resolution or will allow for covering or surveying larger than not using this multi-moment equipment or method.

An example of a simple multi-moment first sequence 22' then SM, LM and HM each lasting:

SM: a moment period 64'A 20 milliseconds with 0.5 millisecond on-time 61'A and 0.5 millisecond off-time 63'A and with a moment strength 61'A of some 5-10,000 amperes×m2 followed by LM: a moment period 64'B 20 milliseconds with 1.5 millisecond on-time 61'B and 1.5 millisecond off-time 63'B and with a moment strength 61'B of some 40-60,000 amperes×m2 followed by HM: a moment period 64'C 20 milliseconds with 8.0 millisecond on-time 61'C and 8.0 millisecond off-time 63'C and with a moment strength 61'C of some 400-500,000 amperes×m2.

This first sequence 22' is followed by an, except for the sign of the moments, identically shaped second sequence 22". I.e. the moment strengths 61"A=−61'A, 61"B=−61'B, and 61"C=−61'C. Thereby the first sequence 22' and the second sequence 22" will suppress grid noise, i.e. generated or industrial noise, with a frequency of 50 Hz. The first 22' and the second 22" sequence lasts a total of 40 milliseconds and with a translocation speed of 75 km/h this translates to a lateral movement or resolution of some 0.833 meters.

Depending of the conditions in the formation 2, of cause, but though indicative, having configured the measuring equipment 1 to perform the stated moment strengths, the SM will survey a near surface depth down to some 50 m, LM will survey some 25 m to 150 m, and HM will survey some 50 m to 400-500 m.

Configuring the measuring equipment with current generators and transmitter coils capable of producing even smaller or higher moments will allow the user to design surveys with desirable resolutions.

Although particular exemplary earmolds have been shown and described, it will be understood that it is not intended to limit the claimed inventions to the exemplary earmolds, and it will be obvious to those skilled in the art that various changes and modifications may be made without departing from the spirit and scope of the claimed inventions. The specification and drawings are, accordingly, to be regarded in an illustrative rather than restrictive sense. The claimed inventions are intended to cover alternatives, modifications, and equivalents.

The invention claimed is:

1. A method for mapping geological structures of a formation on a side of a surface, comprising:
   generating a magnetic moment using at least one magnetic moment generator to build up a magnetic field in the formation in an on-period, wherein the magnetic moment is positioned on another side of the surface;
   changing the magnetic moment to change the magnetic field; and
   making at least one record in a recording device at a recording time $t_{record}$ in an off-period, wherein the record includes at least a representation of the change in the magnetic field and/or a representation of the magnetic field obtained by a B/E-measuring unit;
   wherein the on-period is separated from the off-period by the act of changing the magnetic moment;
   wherein the acts of generating, changing, and making are performed to execute a first sequence;
   wherein the method further comprises repeating one or more of the acts of generating, changing, and making to execute a second sequence, each of the first and second sequences lasting a sequence period and comprising at least one moment period;
   wherein in each of the first and second sequences, a plurality of magnetic moments are generated;
   wherein the first and second sequences are executed at a same position or at positions that are separated by a maximum distance of 50 m;
   wherein the at least one magnetic moment generator is configured to be carried by an airborne vehicle;
   wherein the second sequence is consecutive to the first sequence, and wherein the first and second sequences are consecutively repeated; and
   wherein each magnetic moment in the repeated consecutive first and second sequences has at least one adjacent magnetic moment having a different maximum absolute magnetic moment.

2. The method according to claim 1, wherein one of the magnetic moments in the first sequence has an opposite sign to one of the magnetic moments in the second sequence.

3. The method according to claim 1, wherein the magnetic moments in the first sequence have increasing or decreasing absolute values of moment strengths.

4. The method according to claim 3, wherein the first sequence is performed followed by the second sequence in which the second sequence has identical absolute values of moment strengths of magnetic moments as those of the first sequence, but with opposite signs.

5. The method according to claim 1, wherein each of the first and second sequences has identical, but opposite signed magnetic moments, and wherein the magnetic moments in each of the first and second sequences are separated by a time close to or identical to a grid-period, or multiple thereof, or a natural fraction thereof.

6. The method according to claim 1, further comprising processing the at least one record from the first sequence and another record from the second sequence in a computer to form a representation of the geological structure of the formation.

7. The method according to claim 1, wherein the B/E-measuring unit is in a position relative to the at least one magnetic moment generator for at least the first sequence, in which position an induction from the at least one magnetic moment generator in the B/E-measuring unit is zero or minimal.

8. The method according to claim 1, wherein the magnetic moments for the first and second sequences are generated in air above a ground.

9. The method according to claim 1, wherein the magnetic moments for the first and second sequences are generated in air above the surface of the sea.

10. The method of claim 1, the magnetic moments in the first sequence, the second sequence, or both, are generated by at least one transmitter coil conducting a current $I_T$, where the current $I_T$ has a signal shape that is different for each of the magnetic moments in the first sequence.

11. The method of claim 1, wherein the magnetic moments in the first sequence, the second sequence, or both, are generated by a current $I_T$ that changes in at least part of an ON-time.

12. A method for mapping geological structures of a formation on a side of a surface, comprising:
 generating a magnetic moment using at least one magnetic moment generator to build up a magnetic field in the formation in an on-period, and wherein the magnetic moment is positioned on another side of the surface;
 changing the magnetic moment to change the magnetic field; and
 making at least one record in a recording device at a recording time $t_{record}$ in an off-period, wherein the record includes at least a representation of the change in the magnetic field and/or a representation of the magnetic field obtained by a B/E-measuring unit;
 wherein the on-period is separated from the off-period by the act of changing the magnetic moment;
 wherein the acts of generating, changing, and making are performed for executing a first sequence;
 wherein the method comprises repeating one or more of the acts of generating, changing, and making for executing a second sequence, each of the first and second sequences lasting a sequence period and comprising at least one moment period;
 wherein the first and second sequences are executed at a same position or positions separated by a maximum distance of 50 m, and wherein in each of the first and second sequences, at least two magnetic moments are generated having different respective maximum absolute values of magnetic moment; and
 wherein the at least one magnetic moment generator is carried by an airborne vehicle;
 wherein a duration of the first and second sequences is less than 1 second.

13. The method of claim 12, wherein the at least two magnetic moments in the first sequence has a same sign, and the at least two magnetic moments in the second sequence has a same sign that is opposite to the sign of the at least two magnetic moments in the first sequence.

14. The method of claim 12, wherein the second sequence is consecutive to the first sequence, and wherein the first and second sequences are consecutively repeated.

15. The method of claim 12, further comprising generating one or more additional magnetic moments between the first and second sequences.

16. A measuring equipment for mapping geological structure of a formation on a side of a surface, comprising:
 at least one magnetic moment generator for generating a magnetic moment to build up a magnetic field in the formation;
 at least one changer for changing the magnetic moment to change the magnetic field in the formation;
 at least one B/E-measuring unit for measuring the magnetic field and/or the change in the magnetic field; and
 a recording device for recording at a recording time $t_{record}$ at least one record that includes at least a representation of the change in the magnetic field and/or a representation of the magnetic field measured by the at least one B/E-measuring unit;
 wherein the at least one magnetic moment generator is configured to generate a first plurality of magnetic moments for a first sequence;
 wherein the at least one magnetic moment generator is also configured to generate a second plurality of magnetic moments for a second sequence;
 wherein the measuring equipment is configured for executing the first and second sequences at a same position or at positions that are separated by a maximum distance of 50 m;
 wherein the at least one magnetic moment generator is configured to be carried by an airborne vehicle;
 wherein the second sequence is consecutive to the first sequence, and wherein the first and second sequences are consecutively repeated; and
 wherein each magnetic moment in the repeated consecutive first and second sequences has at least one adjacent magnetic moment having a different maximum absolute magnetic moment.

17. A measuring equipment for mapping the geological structure of a formation on a side of a surface, comprising:
 at least one magnetic moment generator for generating a magnetic moment to build up a magnetic field in the formation;
 at least one changer for changing the magnetic moment to change the magnetic field in the formation;
 at least one B/E-measuring unit for measuring the magnetic field and/or the change in the magnetic field; and
 a recording device for recording at a recording time $t_{record}$ at least one record that includes at least a representation of the change in the magnetic field and/or a representation of the magnetic field measured by the at least one B/E-measuring unit;
 wherein the at least one magnetic moment generator, the at least one B/E-measuring unit, and the recording device are configured to execute a first sequence;
 wherein the at least one magnetic moment generator, the at least one B/E-measuring unit, and the recording device are configured to execute a second sequence;
 wherein each of the first and second sequences has at least one moment period, and wherein the measuring equipment is configured for executing the first and second sequences at a same position or at positions that are separated by a maximum distance of 50 m, and wherein in each of the first and second sequences, at least two magnetic moments are generated having different respective maximum absolute values of magnetic moment;
 wherein the at least one magnetic moment generator is configured to be carried by an airborne vehicle;

wherein a duration of the first and second sequences is less than 1 second.

18. The measuring equipment according to claim 16 or 17, further comprising a controller for changing absolute values of the magnetic moments in the first sequence, and/or a moment periods of the first sequence.

19. The measuring equipment according to claim 16 or 17, further comprising a communication component for transmitting signals to/from the at least one magnetic moment generator, the at least one changer, the at least one B/E-measuring unit, or the recording device.

20. The measuring equipment according to claim 16 or 17, wherein the at least one magnetic moment generator has at least two separate sub-moment generators for respectively generating the magnetic moments in each of the first and second sequences.

21. The measuring equipment according to claim 16 or 17, wherein the at least one magnetic moment generator has a number of separate sub-moment generators.

22. The measuring equipment according to claim 16 or 17, wherein the at least one B/E-measuring unit is in a position relative to the at least one magnetic moment generator, in which position an induction from the at least one magnetic moment generator in the at least one B/E-measuring unit is zero or minimal.

23. The measuring equipment according to claim 16, wherein the at least one magnetic moment generator is configured for generating the magnetic moments for the first and second sequences in air above a ground.

24. The measuring equipment according to claim 16, wherein the at least one magnetic moment generator is configured for generating the magnetic moments for the first and second sequences in air above the surface of the sea.

25. The measuring equipment of claim 16, comprising at least one transmitter coil configured to generate the magnetic moments in the first sequence, the second sequence, or both, by conducting a current $I_T$, where the current $I_T$ has a signal shape that is different for each of the magnetic moments in the first sequence.

26. The measuring equipment of claim 16, comprising at least one transmitter coil configured to generate the magnetic moments in the first sequence, the second sequence, or both, by providing a current IT that changes in at least part of an ON-time.

27. The measuring equipment of claim 17, wherein the at least two magnetic moments in the first sequence has a same sign, and the at least two magnetic moments in the second sequence has a same sign that is opposite to the sign of the at least two magnetic moments in the first sequence.

28. The measuring equipment of claim 17, wherein the second sequence is consecutive to the first sequence, and wherein the first and second sequences are consecutively repeated.

29. The measuring equipment of claim 17, wherein the at least one magnetic moment generator is configured to generate one or more additional magnetic moments between the first and second sequences.

30. A method for mapping geological structure of a formation on a side of a surface, comprising:
  generating a magnetic moment using at least one magnetic moment generator to build up a magnetic field in the formation in an on-period, and wherein the magnetic moment is positioned on another side of the surface;
  changing the magnetic moment to change the magnetic field; and
  making at least one record in a recording device at a recording time $t_{record}$ in an off-period, wherein the record includes at least a representation of the change in the magnetic field and/or a representation of the magnetic field obtained by a B/E-measuring unit;
  wherein the on-period is separated from the off-period by the act of changing the magnetic moment;
  wherein the acts of generating, changing, and making are performed for executing a first sequence;
  wherein the method comprises repeating one or more of the acts of generating, changing, and making for executing a second sequence, each of the first and second sequences lasting a sequence period and comprising at least one moment period;
  wherein in each of the first and second sequences, a plurality of magnetic moments are generated;
  wherein the at least one magnetic moment generator is configured to be carried by an airborne vehicle; and
  wherein each magnetic moment in each of the first and second sequences has at least one adjacent magnetic moment having a different maximum absolute magnetic moment, wherein the first and second sequences are executed at a same position or at positions that are separated by a maximum distance of 50 m, and wherein the first and second sequences are executed within 1 second.

31. The method according to claim 30, wherein one of the magnetic moments in the first sequence has an opposite sign to one of the magnetic moments in the second sequence.

32. The method according to claim 30, wherein the plurality of magnetic moments in the first sequence have increasing or decreasing absolute values of moment strengths.

33. The method according to claim 32, wherein the first sequence is performed followed by the second sequence in which the second sequence has identical absolute values of moment strengths of magnetic moments as those of the first sequence, but with opposite signs.

34. The method according to claim 30, wherein each of the first and second sequences has identical, but opposite signed magnetic moments, and wherein the magnetic moments in each of the first and second sequences are separated by a time close to or identical to a grid-period, or multiple thereof, or a natural fraction thereof.

35. The method according to claim 30, further comprising processing the at least one record from the first sequence and at least one record from the second sequence in a computer to form a representation of the geological structure of the formation.

36. The method according to claim 30, wherein the B/E-measuring unit is in a position relative to the at least one magnetic moment generator for at least the first sequence, in which position an induction from the at least one magnetic moment generator in the B/E-measuring unit is zero or minimal.

37. The method according to claim 30, wherein the magnetic moments for the first and second sequences are generated in air above a ground.

38. The method according to claim 30, wherein the magnetic moments for the first and second sequences are generated in air above the surface of the sea.

39. The method of claim 30, the magnetic moments in the first sequence, the second sequence, or both, are generated by at least one transmitter coil conducting a current $I_T$, where the current $I_T$ has a signal shape that is different for each of the magnetic moments in the first sequence.

40. The method of claim 30, wherein the magnetic moments in the first sequence, the second sequence, or both, are generated by a current $I_T$ that changes in at least part of an ON-time.

41. A geophysical map of an underground obtained by processing records from first and second sequences obtained by a method for mapping geological structures of a formation on a side of a surface, the method comprising:
generating a magnetic moment using at least one magnetic moment generator to build up a magnetic field in the formation in an on-period, and wherein the magnetic moment is positioned on another side of the surface;
changing the magnetic moment to change the magnetic field; and
making at least one record in a recording device at a recording time $t_{record}$ in an off- period, wherein the record includes at least a representation of the change in the magnetic field and/or a representation of the magnetic field obtained by a B/E-measuring unit;
wherein the on-period is separated from the off-period by the act of changing the magnetic moment;
wherein the acts of generating, changing, and making are performed for executing a first sequence;
wherein the method comprises repeating one or more of the acts of generating, changing, and making for executing a second sequence, each of the first and second sequences lasting a sequence period and comprising at least one moment period;
wherein the first and second sequences are executed at a same position or positions separated by a maximum distance of 50 m, and wherein in each of the first and second sequences, at least two magnetic moments are generated having different respective maximum absolute values of magnetic moment;
wherein the at least one magnetic moment generator is carried by an airborne vehicle; and
wherein a duration of the first and second sequences is less than 1 second.

42. A geophysical map of an underground obtained by processing records from first and second sequences obtained by a method for mapping geological structures of a formation on a side of a surface, the method comprising:
generating a magnetic moment using at least one magnetic moment generator to build up a magnetic field in the formation in an on-period, and wherein the magnetic moment is positioned on another side of the surface;
changing the magnetic moment to change the magnetic field; and
making at least one record in a recording device at a recording time $t_{record}$ in an off-period, wherein the record includes at least a representation of the change in the magnetic field and/or a representation of the magnetic field obtained by a B/E-measuring unit;
wherein the on-period is separated from the off-period by the act of changing the magnetic moment;
wherein the acts of generating, changing, and making are performed for executing a first sequence;
wherein the method comprises repeating one or more of the acts of generating, changing, and making for executing a second sequence, each of the first and second sequences lasting a sequence period and comprising at least one moment period;
wherein the first and second sequences are executed at a same position or positions separated by a maximum distance of 50 m, and wherein in each of the first and second sequences, at least two magnetic moments are generated having different respective maximum absolute values of moment strength;
wherein the at least one magnetic moment generator is carried by an airborne vehicle;
wherein a duration of the first and second sequences is less than 1 second; and
wherein the at least two magnetic moments for the first sequence comprise a first magnetic moment and a second magnetic moment, and wherein the method further comprises stacking a first measurement corresponding with the first magnetic moment for the first sequence, with a second measurement corresponding with the second magnetic moment for the first sequence.

43. measuring equipment for mapping geological structure of a formation on a side of a surface, comprising:
at least one magnetic moment generator for generating a magnetic moment to build up a magnetic field in the formation;
at least one changer for changing the magnetic moment to change the magnetic field in the formation;
at least one B/E-measuring unit for measuring the magnetic field and/or the change in the magnetic field; and
a recording device for recording at a recording time $t_{record}$ at least one record that includes at least a representation of the change in the magnetic field and/or a representation of the magnetic field measured by the at least one B/E-measuring unit;
wherein the at least one magnetic moment generator is configured to generate a first plurality of magnetic moments for a first sequence;
wherein the at least one magnetic moment generator is also configured to generate a second plurality of magnetic moments for a second sequence;
wherein the at least one magnetic moment generator is configured to be carried by an airborne vehicle; and
wherein each magnetic moment in each of the first and second sequences has at least one adjacent magnetic moment having a different maximum absolute magnetic moment, wherein the first and second sequences are executed at a same position or at positions that are separated by a maximum distance of 50 m, and wherein the first and second sequences are executed within 1 second.

44. The measuring equipment of claim 43, comprising at least one transmitter coil configured to generate the magnetic moments in the first sequence, the second sequence, or both, by conducting a current $I_T$, where the current $I_T$ has a signal shape that is different for each of the magnetic moments in the first sequence.

45. The measuring equipment of claim 43, comprising at least one transmitter coil configured to generate the magnetic moments in the first sequence, the second sequence, or both, by providing a current $I_T$ that changes in at least part of an ON-time.

* * * * *